United States Patent [19]

Kawasaki et al.

[11] Patent Number: 5,354,828

[45] Date of Patent: Oct. 11, 1994

[54] HIGHER α-OLEFIN COPOLYMER, PROCESS FOR PREPARING SAME, AND VULCANIZABLE RUBBER COMPOSITION

[75] Inventors: Masaaki Kawasaki; Syuji Minami, both of Kuga; Tetsuo Tojo; Keiji Okada, both of Ichihara, all of Japan

[73] Assignee: Mitsui Petrochemical Industries, Ltd., Tokyo, Japan

[21] Appl. No.: 79,845

[22] PCT Filed: Apr. 24, 1990

[86] PCT No.: PCT/JP90/00527

§ 371 Date: Dec. 13, 1990

§ 102(e) Date: Dec. 13, 1990

[87] PCT Pub. No.: WO90/12818

PCT Pub. Date: Jan. 11, 1990

Related U.S. Application Data

[63] Continuation of Ser. No. 613,747, Dec. 13, 1990, abandoned.

[30] Foreign Application Priority Data

| Apr. 24, 1989 [JP] | Japan | 1-103679 |
| Apr. 24, 1989 [JP] | Japan | 1-103680 |
| Apr. 24, 1989 [JP] | Japan | 1-103681 |

[51] Int. Cl.⁵ .................... C08F 236/20; C08L 19/00
[52] U.S. Cl. .................... 526/336; 526/125; 526/128; 526/335; 526/339; 525/232; 525/237
[58] Field of Search ............. 526/336, 125, 128, 335, 526/339; 525/232, 237

[56] References Cited

U.S. PATENT DOCUMENTS

| 2,933,480 | 4/1960 | Gresham et al. | 260/80.5 |
| 3,224,985 | 12/1965 | Gladding et al. | 526/336 X |
| 3,291,780 | 12/1966 | Gladding et al. | 526/336 X |
| 4,284,535 | 8/1981 | Lal et al. | 525/232 X |
| 5,028,671 | 7/1991 | Kioka et al. | 526/128 X |
| 5,075,396 | 12/1991 | Kashiwa et al. | 526/128 X |

FOREIGN PATENT DOCUMENTS 0344380 10/1988 European Pat. Off.

OTHER PUBLICATIONS

Nielsen, "Mechanical Properties of Polymers and Composites," Marcel Dekker, Inc., N.Y., 1974, 20-1.
Patent Abstracts of Japan, vol. 14, No. 220, (C-717) (4163), 10th May 1990, JP-A-02 51 512 (Japan Synthetic Rubber Co. Ltd) Feb. 21, 1990.

*Primary Examiner*—Fred Teskin
*Attorney, Agent, or Firm*—Sherman and Shalloway

[57] ABSTRACT

The higher α-olefin copolymers obtained in accordance with the present invention are copolymers derived from higher α-olefin and non-conjugated diene represented by the following general formula [I], and (a) the non-conjugated diene content thereof is from 0.01 to 30 mol %, and (b) the intrinsic viscosity [η], as measured in decahydronaphthalene at 135° C., of said copolymer is from 1.0 to 10.0 dl/g.

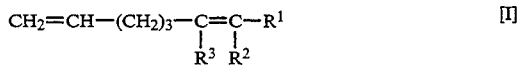

The invention also provides a process for preparing such higher α-olefin copolymers as illustrated above, and vulcanization products obtained from said copolymers.

Furthermore, the invention provides vulcanizable compositions containing rubber comprising of the above-mentioned higher α-olefin copolymers and a specific diene rubber or a specific ethylene/α-olefin copolymer rubber.

21 Claims, 1 Drawing Sheet (A) Transition metal component

Magnesium compound

Electron donor (B) Organometallic component

Copolymer of higher α-olefin of 6-12 carbon atoms and non-conjugated diene (C) Electron donor Organosilicon compound

HIGHER α-OLEFIN COPOLYMER, PROCESS FOR PREPARING SAME, AND VULCANIZABLE RUBBER COMPOSITION

This application is a continuation of application Ser. No. 07/613,747, filed Dec. 13, 1990, now abandoned.

TECHNICAL FIELD

This invention relates to novel higher α-olefin copolymers, process for preparing the same, and vulcanizable rubber compositions.

TECHNICAL BACKGROUND

Because of their excellent heat resistance and ozone resistance, vulcanization products of ethylene-propylene.diene copolymers have been widely used as raw materials for the manufacture of automotive industry parts, industrial rubber products, electrical insulating materials, building industry products, rubber products such as rubber coated fabrics and plastic blending materials for polypropylene, polystyrene, etc. However, because the ethylene-propylene.diene copolymers are poor in resistance to dynamic fatigue, they were found to be unsuitable for specific uses, for example, rubber vibration insulator, rubber roll, belt, tire and covering materials for vibrating section.

U.S. Pat. No. 3,933,769, on the one hand, discloses vulcanizable copolymers low in gel content prepared by copolymerization in the presence of coordination catalyst of at least one monomer selected from 1-butene and α-olefins of 5–12 carbon atoms and mixtures of 5-methyl-1,4-hexadiene and 4-methyl-1,4-hexadiene (containing at least 15% of 5-methyl-1,4-hexadiene). U.S. Pat. No. 4,340,705 discloses sulfur-vulcanizable copolymers low in gel content prepared by copolymerization of monoolefins of 4–12 carbon atoms and non-conjugated α,ω-polyenes of from 8 to about 36 carbon atoms in the presence of catalyst systems prepared by the addition to transition metal compounds and organoaluminum compounds of hexaalkylphosphoric acid triamides or organophosphoric acid esters.

Incidentally, diene rubber such as natural rubber, isoprene rubber, SBR and BR is excellent in properties such as workability and strength and widely used as raw material for the manufacture of tire, automotive parts, general-purpose industrial parts, etc. However, diene rubber had such a disadvantage in that because the diene rubber is poor in weathering resistance and ozone resistance, the articles manufactured therefrom are short in product life.

U.S. Pat. No. 4,645,793 discloses blends of ethylene.α-olefin copolymer rubber improved in weathering resistance and ozone resistance. However, such blends of ethylene.α-olefin copolymer rubber had a disadvantage that they deteriorate in resistance to dynamic fatigue (flexural fatigue resistance) or in adhesion to fiber, though they are certainly improved in weathering resistance and ozone resistance.

Ethylene-α-olefin copolymer rubber typified by ethylene propylene diene copolymer rubber has been widely used for the manufacture of automotive parts, industrial rubber products, electrical insulating materials and building industry products because of its excellent strength characteristics, heat resistance and weathering resistance. However, because ethylene.α-olefin copolymer rubber is poor in resistance to dynamic fatigue, vibration-damping properties and vibration-deadening properties, there was much room for further improvement when it is used for the manufacture of rubber vibration insulator, rubber roll, belt and tire.

On the one hand, though natural rubber is excellent in strength characteristics and resistance to dynamic fatigue, it is poor in heat resistance and weathering resistance, and also its vibration-damping properties and vibration-deadening properties cannot be said to be sufficient, and a further improvement from the practical viewpoint of these properties was desired.

The present invention is intended to solve such technical problems associated with the prior art, and an object of the invention is to provide novel higher α-olefin.non-conjugated diene copolymers that are sulfur-vulcanizable and substantially free from gel formation, processes for preparing the same, and to novel vulcanization products obtained from the higher α-olefin.non-conjugated diene copolymers, said vulcanization products being excellent in weathering resistance, ozone resistance, resistance to heat aging, low-temperature characteristics, vibration-damping properties and resistance to dynamic fatigue.

A further object of the invention is to provide vulcanizable rubber compositions excellent in workability, strength characteristics, weathering resistance, ozone resistance and resistance to dynamic fatigue and also excellent in adhesion to fiber.

Another object of the invention is to provide vulcanizable rubber compositions excellent in strength characteristics, heat resistance, weathering resistance, vibration-damping properties, vibration-deadening properties and resistance to dynamic fatigue.

DISCLOSURE OF THE INVENTION

The higher α-olefin copolymers of the present invention which are copolymers of higher α-olefin of 6–12 carbon atoms and non-conjugated diene represented by the following general formula [I] are characterized by having (a) the non-conjugated diene content of 0.01–30 mol %, and (b) an intrinsic viscosity $[\eta]$, as measured in decahydronaphthalene at 135° C., of 1.0–10.0 dl/g.

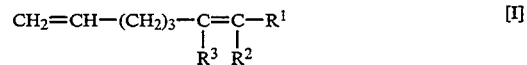

wherein $R^1$ represents alkyl of 1–4 carbon atoms, and $R^2$ and $R^3$ each represent hydrogen atom or alkyl of 1–4 carbon atoms, provided that under no circumstances both $R^2$ and $R^3$ are hydrogen atoms.

The process for preparing the higher α-olefin copolymers of the present invention is characterized in that a higher α-olefin of 6–12 carbon atoms and a non-conjugated diene of the above-mentioned general formula [I] are copolymerized in the presence of an olefin polymerization catalyst obtainable from

[A] a solid titanium catalyst component containing magnesium, titanium, halogen and an electron donor as essential constituents,

[B] an organoaluminum compound catalyst component, and

[C] an electron donor catalyst component to obtain a higher α-olefin copolymer having the non-conjugated diene content of 0.01–30 mol % and an intrinsic viscosity $[\eta]$, as measured in decahydronaphthalene at 135° C., of 1.0–10.0 dl/g.

The vulcanization products of the present invention are characterized in that they are vulcanization products of the higher α-olefin copolymers of the invention.

The first vulcanizable rubber compositions of the present invention are characterized by containing a higher α-olefin copolymer rubber (1) derived from a higher α-olefin of 6-12 carbon atoms and a non-conjugated diene of the above-mentioned general formula [I] and a diene rubber (2), the weight ratio [(1)/(2)] of said higher α-olefin copolymer rubber (1) to diene rubber (2) being 5/95-95/5.

The second vulcanizable rubber compositions of the present invention are characterized by containing a higher α-olefin copolymer rubber (1) derived from a higher α-olefin of 6-12 carbon atoms and a non-conjugated diene of the above-mentioned general formula [I] and an ethylene/α-olefin copolymer rubber (3) derived from ethylene and α-olefin of 3-6 carbon atoms, the weight ratio [(1)/(3)] of said higher α-olefin copolymer rubber (1) to ethylene/α-olefin copolymer rubber (3) being 5/95-95/5.

BEST MODE FOR PRACTICING THE INVENTION

Figure 1:
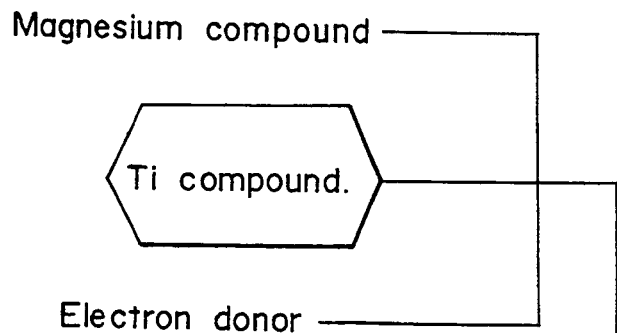
FIG. 1 is a flow chart showing a step of preparing an olefin polymerization catalyst used in the preparation of the higher α-olefin copolymers of the present invention and a step of preparing an olefin polymerization catalyst used in the preparation of the higher α-olefin copolymer rubber (1) of the present invention.
Figure 1:
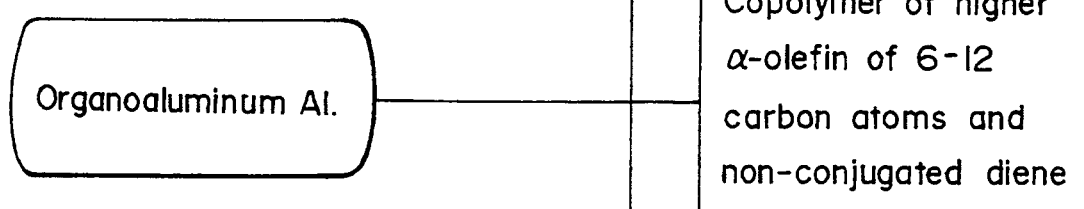

The higher α-olefin copolymers, process for preparing the same, vulcanization products and vulcanizable rubber compositions of the present invention are illustrated below in detail.

First of all, the higher α-olefin copolymers, process for preparing the same and vulcanization products of the invention are illustrated hereinafter.

The higher α-olefin copolymers of the invention are derived from a higher olefin and a non-conjugated diene.

Useful higher α-olefins in the invention are α-olefins of 6-12 carbon atoms, including concretely hexene-1, heptene-1, octene-1, nonene-1, decene-1, undecene-1 and dodecene-1.

In the invention, the higher α-olefins may be used, either singly or in admixture of two or more.

Useful non-conjugated dienes in the invention are those represented by the following general formula [I].

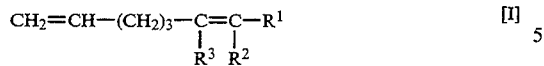

$$CH_2=CH-(CH_2)_3-\underset{R^3}{C}=\underset{R^2}{C}-R^1 \qquad [I]$$

wherein $R^1$ represents alkyl of 1-4 carbon atoms, and $R^2$ and $R^3$ each represent hydrogen atom or alkyl of 1-4 carbon atoms, provided that under no circumstances both $R^2$ and $R^3$ are hydrogen atoms.

The non-conjugated dienes as illustrated above include concretely 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene and 6-methyl-1,6-undecadiene.

In the invention, the non-conjugated dienes as exemplified above may be used, either singly or in admixture of two or more.

Of the above-exemplified non-conjugated dienes, particularly useful is 7-methyl-1,6-octadiene.

In addition to the non-conjugated dienes as mentioned above, other copolymerizable monomers such as ethylene, propylene, butene-1, pentene-1 and 4-methylpentene-1 may be used in the invention so long as the use of these compounds shall not hinder the present invention from accomplishing its objects.

The content of units derived from the non-conjugated diene used in the higher α-olefin copolymers of the invention is 0.01-30 mol %, preferably 0.1-20 mol %. The composition of the higher α-olefin copolymers is determined by $^{13}$C-NMR analysis. This characteristic value thus obtained is serviceable as a measure in vulcanizing the higher α-olefin copolymers of the present invention by using sulfur or peroxides.

The higher α-olefin copolymers of the invention have an intrinsic viscosity [η], as measured in decahydronaphthalene at 135° C., of 1.0-10.0 dl/g, preferably 1.5-8 dl/g. This characteristic value is a measure to indicate a molecular weight of the higher α-olefin copolymers.

The higher α-olefin copolymers of the present invention may be obtained by copolymerizing higher α-olefins and non-conjugated dienes in the presence of olefin polymerization catalyst.

The olefin polymerization catalysts used in the invention are composed of solid titanium catalyst components [A], organoaluminum compound catalyst components [B] and election donor catalyst components [C].

Shown in FIG. 1, as an example, a flow chart of the process for preparing olefin polymerization catalyst components of the present invention.

The solid titanium catalyst components [A] used in the invention are highly activated catalyst components containing magnesium, titanium, halogen and an electron donor.

The solid titanium catalyst components [A] may be prepared by bringing the following magnesium compounds, titanium compounds and electron donors into contact with one another.

The titanium compounds used for preparing the solid titanium catalyst components [A] of the invention include, for example, tetravalent titanium compounds represented by $Ti(OR)_g X_{4-g}$ (R is a hydrocarbon group, X is a halogen atom, and g is $0 \leq g \leq 4$). More particularly, the tetravalent titanium compounds include those enumerated below.

Titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{-normal }C_4H_9)Cl_3$, $Ti(OC_2H_5)Br_3$ and $Ti(O\text{-iso }C_4H_9)Br_3$; dialkoxytitanium dihalides such as $Ti(OCH_3)_2Cl_2$, $Ti(OC_2H_5)_2Cl_2$, $Ti(O\text{-normal }C_4H_9)_2Cl_2$ and $Ti(OC_2H_5)_2Br_2$; Trialkoxytitanium monohalides such as $Ti(OCH_3)_3Cl$, $Ti(OC_2H_5)_3Cl$, $Ti(O\text{-normal }C_4H_9)_3Cl$ and $Ti(OC_2H_5)_3Br$; and tetraalkoxytitanium such as $Ti(OCH_3)_4$, $Ti(OC_2H_5)_4$, $Ti(O\text{-normal }C_4H_9)_4$, $Ti(O\text{-iso }C_4H_9)_4$ and $Ti(O\text{-2-ethylhexyl})_4$.

Of the halogen containing titanium compounds enumerated above, particularly preferred are titanium tetrahalides and specifically preferred is titanium tetrachloride. These titanium compounds may be used, either singly or in combination of two or more. These titanium compounds, when they are used, may be diluted with hydrocarbon compounds or halogenated hydrocarbon compounds.

The magnesium compounds used for preparing the solid titanium catalyst components [A] of the invention may include those having reducibility and those having no reducibility.

The magnesium compounds having reducibility as referred to herein include, for example, those having a magnesium carbon bond or a magnesium hydrogen bond. Concrete examples of such magnesium compounds having reducibility may include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, octylbutylmagnesium, butylmagnesium halides, etc. These magnesium compounds may be used singly, and they also may form complex compounds with the organoaluminum compounds that will be mentioned later. Further these magnesium compound may be liquid or solid.

Concrete examples of the magnesium compound having no reducibility include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; phenoxymagnesium halides such as phenoxymagnesium chloride and methylphenoxymagnesium chloride; alkoxymagnesium such as ethoxymagnesium, isopropoxymagnesium, butoxymagnesium, n-octoxymagnesium and 2-ethylhexoxymagnesium; aryloxymagnesium such as alkoxymagnesium and dimethylphenoxymagnesium; and carboxylates of magnesium such as magnesium laurate and magnesium stearate.

These magnesium compounds having no reducibility as exemplified above may be those derived from the above-mentioned magnesium compounds having reducibility or those derived therefrom at the time of preparing catalyst components. The magnesium compounds having no reducibility may be derived from the magnesium compounds having reducibility, for example, by bringing the magnesium compounds having reducibility into contact with polysiloxane compounds, halogen containing silane compounds, halogen containing aluminum compounds, esters or alcohols.

Besides the above-mentioned magnesium compounds having reducibility and having no reducibility, the magnesium compounds used in the present invention may be complex compounds or double compounds of the above-mentioned magnesium compounds with other metals, or may be mixtures of the above-mentioned magnesium compounds and other metallic compounds. The magnesium compounds used in the invention may be mixtures containing two or more compounds as illustrated above.

Of the magnesium compounds used in the invention, preferred are those having no reducibility, particularly preferred are halogen containing magnesium compounds and specifically magnesium chloride, alkoxymagnesium chloride and aryloxymagnesium chloride.

The electron donors used for preparing the solid titanium catalyst components [A] of the invention are organic carboxylic acid esters, preferably polycarboxylic acid esters including concretely compounds having their skeleton represented by the following formulas.

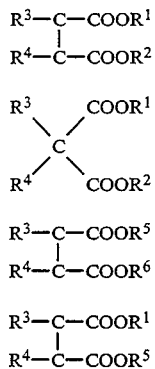

In the formula mentioned above, $R^1$ represents substituted or unsubstituted hydrocarbon, $R^2$, $R^5$ and $R^6$ each represent hydrogen atom, substituted or unsubstituted hydrocarbon, and $R^3$ and $R^4$ each represent hydrogen atom, substituted or unsubstituted hydrocarbon. At least one of $R^3$ and $R^4$ is preferably substituted or unsubstituted hydrocarbon, and $R^3$ and $R^4$ may, linking together, form a cyclic structure. The substituted hydrocarbon groups include those having their substituent of such structure containing atoms different in kind, such as N, O or S, for examples, as —C—O—C—, —COOR, —COOH, —OH, —SO₃H, —C—N—C— or —NH₂.

Of the polycarboxylic acid esters as illustrated above, preferred are diesters derived from dicarboxylic acid in which at least one of $R^1$ and $R^2$ is alkyl of at least 2 carbon atoms.

Concrete examples of the polycarboxylic acid esters include aliphatic polycarboxylic acid esters such as diethyl succinate, dibutyl succinate, diethyl methylsuccinate, diisobutyl α-methylglutarate, dibutylmethyl malonate, diethyl malonate, diethyl ethylmalonate, diethyl isopropylmalonate, diethyl butylmalonate, diethyl phenylmalonate, diethyl diethylmalonate, diethyl arylmalonate, diethyl diisobutylmalonate, diethyl normalbutylmalonate, dimethyl maleate, monooctyl maleate, diisooctyl maleate, diisobutyl maleate, diisobutyl butylmaleate, diethyl butylmaleate, diisopropyl β-methylglutarate, diaryl ethylsuccinate, di-2-ethylhexyl fumarate, diethyl itaconate, diisobutyl itaconate, diisooctyl citraconate and dimethyl citraconate; alicyclic polycarboxylic acid esters such as diethyl 1,2-cyclohexanecarboxylic acid, diisobutyl 1,2-cyclohexanecarboxylic acid, diethyl tetrahydrophthalate and diethyl nadiate; aromatic polycarboxylic acid esters such as monoethyl phthalate, dimethyl phthalate, methylethyl phthalate, monoisobutyl phthalate, diethyl phthalate, ethylisobutyl phthalate, mononormal butyl phthalate, ethylnormalbutyl phthalate, di-n-propyl phthalate, diisopropyl phthalate, di-n-butyl phthalate, diisobutyl phthalate, di-n-heptyl phthalate, di-2-ethylhexyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and esters derived from heterocyclic polycarboxylic acid such as 3,4-furandicarboxylic acid.

Examples of polycarboxylic acid esters other than those exemplified above may include esters derived from long chain dicarboxylic acids, such as diethyl adipate, diisobutyl adipate, diisopropyl sebacate, di-n-butyl sebacate, n-octyl sebacate and di-2-ethylhexyl sebacate.

Of these polycarboxylic acid esters as exemplified above, preferred are compounds having the skeleton represented by the aforementioned general formulas, especially preferred are esters derived from phthalic acid, maleic acid and substituted malonic acid with alcohol of at least 2 carbon atoms, and particularly preferred are diesters obtained by reaction of phthalic acid with alcohol of at least 2 carbon atoms.

These polycarboxylic acid esters mentioned above are not always derived from such polycarboxylic acids as mentioned above, and they may be formed in the stage of preparing the solid titanium catalyst components [A] by using compounds from which these polycarboxylic acid esters can be derived.

Besides the polycarboxylic acid esters, the electron donors which can be used for preparing the solid catalyst components [A] of the invention may include alcohols, amines, amides, ethers, ketones, nitriles, phosphines, stibines, arsines, phosphoramides, esters, thioethers, thioesters, acid anhydrides, aldehydes, alcolates, organosilicon compounds such as alkoxy (aryloxy) silanes, organic acids and amides and salts of metals belonging to Groups I-IV of the periodic table.

The solid titanium catalyst components [A] may be prepared by bringing the above-mentioned magnesium compounds (or metallic magnesium), electron donors and titanium compounds into contact with one another. In preparing the solid titanium catalyst components [A], there may be employed known methods for preparing highly active titanium catalyst components from magnesium compounds, titanium compounds and electron donors. The above-mentioned components may be brought into contact with one another in the presence of other reaction agents, for example, silicon, phosphorus and aluminum.

Briefly illustrated below are some examples of the known methods for preparing the solid titanium catalyst components [A].

(1) A method wherein magnesium compounds or complex compounds composed of magnesium compounds and electron donors are allowed to react with titanium compounds in a liquid phase. This reaction may be carried out in the presence of grinding assistants. In carrying out the reaction in the manner as mentioned above, the compounds, if they are solid, may be ground before use. Furthermore, when the reaction is carried out in the above manner, the components may be pretreated with reaction assistants such as electron donors and/or organoaluminum compounds, or halogen containing silicon compounds. In this method, the above-mentioned electron donors are used at least one time.

(2) A method wherein liquid magnesium compounds having no reducibility are allowed to react with liquid titanium compounds in the presence of electron donors to separate out solid titanium composites.

(3) A method wherein the reaction products obtained by the method (2) are allowed to react further with titanium compounds.

(4) A method wherein the reaction products obtained by the method (1) or (2) are allowed to react further with electron donors and titanium compounds.

(5) A method wherein solid products obtained by grinding magnesium compounds or complex compounds comprising magnesium compounds and electron donors in the presence of titanium compounds are treated with any of halogen, halogen compounds and aromatic hydrocarbons. In this method, the magnesium compounds or the complex compounds comprising magnesium compounds and electron donors may be ground in the presence of grinding assistants. Furthermore, the magnesium compounds or the complex compounds comprising magnesium compounds and electron donors may be ground in the presence of titanium compound and then pretreated with reaction assistants, followed by treating with halogen or the like. The reaction assistant used in this case includes organoaluminum compounds or halogen containing silicon compounds. In this method, the electron donors are used at least one time.

(6) A method wherein the compounds obtained by the above-mentioned methods (1)-(4) are treated with halogen, halogen compounds or aromatic hydrocarbons.

(7) Reaction products of metallic oxides, dihydrocarbylmagnesium and halogen containing alcohol are brought into contact with electron donors and titanium compounds.

(8) A method wherein magnesium compounds such as magnesium salts of organic acid, alkoxymagnesium and aryloxymagnesium are allowed to react with electron donors, titanium compounds and/or halogen containing hydrocarbons.

Of the methods (1)-(8) for preparing the solid titanium catalyst components [A] as illustrated above, preferred is the method wherein the liquid titanium compounds are used at the time of preparing the solid titanium catalyst components [A], or the method wherein the halogenated hydrocarbons are used after the use of the titanium compounds or at the time of using the titanium compounds.

Though the amount of the above-mentioned ingredients used at the time of preparing the solid titanium catalyst components [A] varies according to the method of preparation of said catalyst components and hence cannot be defined indiscriminatively, for example, the amount, based on mole of the magnesium compound, of the electron donor used is about 0.01–5 moles, preferably 0.05–2 moles, and that of the titanium compound used is about 0.01–500 moles, preferably 0.05–300 moles.

The solid titanium catalyst components [A] thus obtained contain magnesium, titanium, halogen and electron donor as essential ingredients.

In this solid titanium catalyst component [A], the halogen/titanium ratio (atomic ratio) is about 4–200, preferably about 5–100, the electron donor/titanium ratio (molar ratio) is about 0.1–10, preferably about 0.2 to about 6, and the magnesium/titanium ratio (atomic ratio) is about 1–100, preferably about 2–50.

In comparison with commercially available halogenated magnesium, this solid titanium catalyst component [A] contains halogenated magnesium smaller in crystal size, and their specific surface area is usually at least about 50 $m^2/g$, preferably about 60–1000 $m^2/g$ and especially about 100–800 $m^2/g$. And, this solid titanium catalyst component [A] will not substantially change in composition even when washed with hexane, because said catalyst component is formed in a body by the above-mentioned ingredients.

The solid titanium catalyst components [A] may be used either singly or after dilution with inorganic or organic compounds, for example, silicon compounds, aluminum compounds or polyolefins. The solid titanium catalyst components [A] diluted with such diluents as mentioned above still exhibit high catalyst activities even when their specific surface area is smaller than that defined above.

Methods for preparing such highly active titanium catalyst components as illustrated above and necessary conditions therefor are disclosed, for example, in Japanese Patent L-O-P Publns. Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138708/1983, 138709/1983, 138710/1983, 138715/1983, 23404/1985, 21109/1986, 37802/1986 and 37803/1986.

Useful as the organoaluminum compound catalyst components [B] are compounds having in the molecule at least one Al—C bond. Such compounds include, for example, (i) organoaluminum compounds represented by the general formula $R^1_m Al(OR^2)_n H_p X_q$ wherein $R^1$ and $R^2$, which may be the same or different, are each hydrocarbon of usually 1-15 carbon atoms, preferably 1-4 carbon atoms, X represents halogen atom, m is $0 < m \leq 3$, n is $0 < n < 3$, p is $0 \leq p < 3$, q is $0 \leq q < 3$, and $m+n+p+q=3$, and (ii) complex alkylation products of metals belonging to Group I of the periodic table and aluminum represented by the general formula $M^1 AlR^1_4$ wherein $M^1$ is Li, Na or K, and $R^1$ is as defined above.

The organoaluminum compounds belonging to the above-mentioned (i) include those represented by the following general formulas.

General formula $R^1_m Al(OR^2)_{3-m}$ wherein $R^1$ and $R^2$ are as defined above, and m is preferably $1.5 \leq m \leq 3$, general formula $R^1_m AlX_{3-m}$ wherein $R^1$ is as defined above, X is halogen, and m is preferably $0 < m < 3$, general formula $R^1_m AlH_{3-m}$ wherein $R^1$ is as defined above, and m is preferably $2 \leq m < 3$, and general formula $R^1_m Al(OR^2)_n X_q$ wherein $R^1$ and $R^2$ are as defined above, X is halogen, m is $0 < m \leq 3$, n is $0 \leq n < 3$, q is $0 \leq q < 3$, and $m+n+q=3$.

More particularly, the aluminum compounds belonging to the aforementioned (i) include trialkylaluminum such as triethylaluminum and tributylaluminum; tiralkenylaluminum such as triisoprenylaluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; partially alkoxylated alkylaluminum having an average composition represented by $R^1_{2.5} Al(OR^2)_{0.5}$; dialkylaluminum halides such as diethylaluminum chloride, dibutylaluminum chloride and diethylaluminum bromide; alkylaluminum sesquihalides such as ethylaluminum sesquichloride, butylaluminum sesquichloride and ethylaluminum sesquibromide; partially halogenated alkylaluminum such as alkylaluminum dihalides including ethylaluminum dichloride, propylaluminum dichloride and butylaluminum dibromide; dialkylaluminum hydrides such as diethylaluminum hydride and dibutylaluminum hydride; other partially hydrogenated alkylaluminum such as alkylaluminum dihydrides including ethylaluminum dihydride and propylaluminum dihydride; and partially alkoxylated and halogenated alkylaluminum such as ethylaluminum ethoxychloride, butylaluminum butoxychloride and ethylaluminum ethoxybromide.

Organoaluminum compounds in which at least two aluminum atoms are linked together through oxygen or nitrogen atom may be mentioned as those analogous to the organoaluminum compounds belonging to the aforementioned (i). Such organoaluminum compounds as mentioned above may include, for example, $(C_2H_5)_2AlOAl(C_2H_5)_2$, $(C_4H_9)_2AlOAl(C_4H_9)_2$,

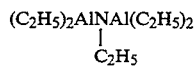

and methylaluminoxane.

The compounds belonging to the aforementioned (ii) may include $LiAl(C_2H_5)_4$ and $LiAl(C_7H_{15})_4$.

Of the compounds as exemplified above, preferably used are those of the class of trialkylaluminum or those of the class of alkylaluminum in which at least two aluminum compounds are linked together.

Useful as the electron donor catalyst components [C] are alcohols, phenols, ketones, aldehydes, carboxylic acids, esters of organic or inorganic acids, ethers, acid amides, acid anhydrides, oxygen containing electron donors such as alkoxysilane, nitrogen containing electron donors such as ammonia, amines nitriles and isocyanate, or the aforementioned polycarboxylic acid esters. The above-mentioned compounds include concretely alcohols of 1-18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol; phenols of 6-20 carbon atoms which may have lower alkyl, such as phenol, cresol, xylenol, ethylphenol, propylphenol, nonylphenol, cumylphenol and naphthol; ketones of 3-15 carbon atoms such as acetone, methyl ethyl ketone, methyl isobutyl ketone, acetophenone, benzophenone and benzoquinone; aldehydes of 2-15 carbon atoms such as acetaldehyde, propionaldehyde, octylaldehyde, benzaldehyde, tolualdehyde and naphthaldehyde; organic acid esters of 2-30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexanecarboxylate, diethyl nadeate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate; acid halides of 2-15 carbon atoms such as acetyl chloride, benzoyl chloride, toluic acid chloride and anisic acid chloride; ethers of 2-20 carbon atoms such as methyl ether, ethyl ether, isopropyl ether, butyl ether, amyl ether, tetrahydrofuran, anisole and diphenyl ether; acid amides such as acetic acid amide, benzoic acid amide and toluic acid amide; amines such as methylamine, ethylamine, diethylamine, tributylamine, piperidine, tribenzylamine, aniline, pyridine, picoline and tetramethylenediamine; nitriles such as acetonitrile, benzonitrile and tolunitrile; and acid anhydrides such as acetic anhydride, phthalic anhydride and benzoic anhydride.

Organosilicon compounds represented by the following general formula [I] may also be used as the electron donor catalyst components [C].

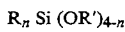
$$R_n Si (OR')_{4-n} \quad [I]$$

wherein R and R' are each hydrocarbon group, and n is $0 < n < 4$.

Concrete examples of the organosilicon compounds represented by the above-mentioned general formula [I] used in the invention are trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltoluethoxysilane, ethyltolumethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane) and vinyltriacetoxysilane.

Of these silane compounds as exemplified above, preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-ptolyldimethoxysilane, p-tolylmethyldimethoxysilane, dicyclohexyldimethoxysilane, cyclohexyldimethoxysilane, 2-norbornanetriethoxysilane, 2-norbornanemethyldimethoxysilane and diphenyldiethoxysilane.

Organosilicon compounds represented by the following general formula [II] may also be used as the electron donor catalyst components [C].

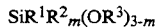
$$SiR^1R^2_m(OR^3)_{3-m} \quad [II]$$

wherein $R^1$ is cyclopentyl or cyclopentyl having alkyl, $R^2$ is the group selected from the group consisting of alkyl, cyclopentyl and cyclopentyl having alkyl, $R^3$ is hydrocarbon, and m is $0 \leq m \leq 2$.

In the above-mentioned formula [II], $R^1$ is cyclopentyl or cyclopentyl having alkyl, and besides cyclopentyl, $R^1$ includes cyclopentyl having alkyl such as 2-methylcyclopentyl, 3-methylcyclopentyl, 2-ethylcyclopentyl and 2,3-dimethylcyclopentyl.

In the above formula [II], $R^2$ is alkyl, cyclopentyl or cyclopentyl having alkyl, and $R^2$ includes alkyl such as methyl, ethyl, propyl, isopropyl, butyl and hexyl, and also includes cyclopentyl and cyclopentyl having alkyl defined as $R^1$ above.

In the formula [II] above, $R^3$ is hydrocarbon and includes alkyl, cycloalkyl, aryl and aralkyl.

Of the organosilicon compounds of the general formula [II] as illustrated above, preferred are those in which $R^1$ is cyclopentyl, $R^2$ is alkyl or cyclopentyl, and $R^3$ is alkyl particularly methyl or ethyl.

Concrete examples of the above-mentioned organosilicon compounds are trialkoxysilanes such as cyclopentyltrimethoxy silane, 2-methylcyclopentyl-trimethoxysilane, 2,3-dimethylcyclopentyltrimethoxysilane and cyclopentyltriethoxysilane;

dialkoxysilanes such as dicyclopentyldimethoxysilane, bis(2-methylcyclopentyl)dimethoxysilane, bis(2,3-dimethylcyclopentyl)dimethoxysilane and dicyclopentyldiethoxysilane; and monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane. Of the electron donors as illustrated above, preferred are the organic carboxylic acid esters and organosilicon compounds, particularly the organosilicon compounds as exemplified above.

The olefin polymerization catalysts used in the present invention are obtainable from the above-mentioned solid titanium catalyst components [A], organoaluminum compound catalyst components [B] and electron donor catalyst components [C]. In the invention higher α-olefin and non-conjugated diene are polymerized in the presence of this polymerization catalyst, but, in this case, it is also possible that α-olefin or higher α-olefin is pre-polymerized in the presence of this polymerization catalyst, followed by copolymerization (main polymerization) of higher α-olefin and non-conjugated diene using this catalyst. In carrying out this pre-polymerization, α-olefin or higher α-olefin is used in an amount, based on 1 g of the olefin polymerization catalyst, of 0.1–500 g, preferably 0.3–300 g and especially 1–100 g.

In the pre-polymerization mentioned above, the catalyst may be used in a concentration considerably higher than that in the system of the main polymerization.

The concentration, based on 1 liter of the inert hydrocarbon medium mentioned later, of the solid titanium catalyst component [A] used in the pre-polymerization is usually, in terms of titanium atom, about 0.01–200 mmoles, preferably about 0.1–100 mmoles and especially 1–50 mmoles.

The amount of the organoaluminum compound catalyst component [B] used in the prepolymerization may be such an amount that the polymer is formed in an amount of 0.1–500 g, preferably 0.3–300 g based on 1 g of the solid titanium catalyst component [A], and is usually about 0.1–100 moles, preferably about 0.5–50 moles and especially 1–20 moles based on 1 mole of titanium atom present in the solid titanium catalyst component [A].

The electron donor catalyst component [C] is used in the pre-polymerization in an amount, based on 1 mole of titanium atom present in the solid titanium catalyst component [A], of 0.1–50 moles, preferably 0.5–30 moles and especially 1–10 moles.

The pre-polymerization mentioned above is desirably carried out with a mixture of an inert hydrocarbon medium, α-olefin or higher α-olefin and the above-mentioned catalyst components under mild conditions.

The inert hydrocarbon medium used in this prepolymerization includes concretely aliphatic hydrocarbons such as propane, butane, pentane, hexane, heptane, octane, decane, dodecane and kerosine; alicyclic hydrocarbons such as cyclopentane, cyclohexane and methyl-cyclopentane; aromatic hydrocarbons such as benzene, toluene and xylene; halogenated hydrocarbons such as ethylene chloride and chlorobenzene; or mixtures thereof. Of these inert hydrocarbon media as exemplified above, particularly preferred are aliphatic hydrocarbons. The pre-polymerization may be carried out by using α-olefin or higher α-olefin as a solvent or substantially in the absence of the solvent.

The higher α-olefin used in the pre-polymerization may be the same as those used in the main polymerization as will be mentioned later or different therefrom.

The reaction temperature employed in the prepolymerization is usually about −20° to +100° C., preferably about −20° to +80° C. and especially 0°–40° C.

In this pre-polymerization, a molecular weight modifier such as hydrogen may be used. This molecular weight modifier is desirably used in such an amount that an intrinsic viscosity [η], as measured in decaline at 135° C., of the polymer resulting from the pre-polymerization becomes about at least 0.2 dl/g, preferably about 0.5–10 dl/g.

The pre-polymerization is desirably carried out in such a manner that the amount of the polymer formed is about 0.1–500 g, preferably about 0.3–300 g and especially 1–100 g per 1 g of the solid titanium catalyst component [A] used. If the pre-polymerization amount is excessively large, productive efficiency of the resulting olefin polymer decreases in certain cases.

This pre-polymerization may be carried out either in a batch-wise manner or continuous manner.

In the manner as described above, the pre-polymerization is carried out in the olefin polymerization catalyst obtainable from the solid titanium catalyst components [A], organoaluminum compound catalyst components [B] and electron donor catalyst components [C], followed by copolymerization (main polymerization) of higher α-olefin and non-conjugated diene in the presence of this olefin polymerization catalyst.

In carrying out the copolymerization (main polymerization) of higher α-olefin and non-conjugated diene, there may be used, besides the above-mentioned olefin polymerization catalyst, organoaluminum compound components similar to the organoaluminum compound catalyst components [B] used in preparing the above-mentioned olefin polymerization catalyst, and electron donor catalyst components similar to the electron donor catalysts [C] used in preparing the above-mentioned olefin polymerization catalyst. In this connection, the organoaluminum compound catalyst components and electron donor catalyst components used in the copolymerization (main polymerization) of higher α-olefin and non-conjugated diene are not always same as those used in preparing the above-mentioned olefin polymerization catalyst.

The copolymerization (main polymerization) of higher α-olefin and non-conjugated diene is carried out usually in a vapor phase or liquid phase.

In the copolymerization (main polymerization) of higher α-olefin and non-conjugated diene, the solid titanium catalyst component [A] is used in an amount, based on 1 liter of the polymerization volume, of usually about 0.001 to about 1.0 mmole, preferably about 0.005–0.5 mmole, the organoaluminum compound catalyst component [B] is used in such an amount that the metal atoms present in the organoaluminum compound catalyst component [B] is usually about 1–2000 mole, preferably about 5–500 moles per mole of titanium atoms present in the solid titanium catalyst component [A], and the electron donor catalyst component [C] is used in an amount, based on 1 mole of the metal atoms present in the organoaluminum compound catalyst component [B], of usually about 0.001–10 moles, preferably about 0.01–2 moles and especially about 0.05–1 mole.

At the time when the main polymerization is carried out, a molecular weight of the resulting polymer may be modified by controlling the amount of hydrogen added to the polymerization system.

In the copolymerization of higher α-olefin and non-conjugated diene of the present invention, the polymerization temperature employed is usually about 10°–200° C., preferably about 30°–100° C., and the pressure employed is usually from normal pressure to 100 kg/cm², preferably from normal pressure to 50 kg/cm². In the copolymerization (main polymerization) of higher α-olefin and non-conjugated diene, the polymerization may be carried out by any of the batch-wise, semi-continuous and continuous methods. The polymerization may also be carried out in two stages or more while varying the reaction conditions.

The higher α-olefin copolymers of the present invention obtained by the above-mentioned polymerization are used as polymers excellent in resistance to dynamic fatigue, heat resistance, ozone resistance and low temperature characteristics. The higher α-olefin copolymers of the invention, when applied particularly to resin modifiers and various rubber products, exhibit their characteristics to the maximum extent.

The present higher α-olefin copolymers may be used as modifiers for resins, for example, polypropylene, polyethylene, polystyrene, etc. When these resins are incorporated with the present higher α-olefin copolymers, the resins can be improved sharply in impact resistance and resistance to stress-crack.

The rubber products are used generally in a vulcanized state. The present higher α-olefin copolymers exhibit their specific characteristics when they are used in a vulcanized state. When the present higher α-olefin copolymers are used as rubber products, the vulcanization product thereof is prepared usually in such a manner that an unvulcanized rubber compound is first prepared in the same way as in the case of vulcanization of common rubber, and the rubber compound is molded into a desired shape, followed by vulcanization.

The vulcanization may be carried out by heating the molded compound rubber using a vulcanizing agent or by irradiating the molded rubber compound with an electron beam.

The vulcanizing agent used in that case includes sulfur compounds and organic peroxides. Concrete examples of the sulfur compounds are sulfur, sulfur chloride, sulfur dichloride, morpholinedisulfide, alkylphenol disulfide, tetramethylthiuram disulfide and selenium dimethyldithiocarbamate. Of these vulcanizing agents exemplified above, preferred is sulfur. The sulfur compound is used in an amount, based on 100 parts by weight of the present higher α-olefin copolymer, of 0.1–10 parts by weight, preferably 0.5–5 parts by weight. Concrete examples of the organic peroxide are dicumyl peroxide, 2,5-dimethyl-2,5-di(t-butylperoxy)-hexane, 2,5-dimethyl-2,5-di(benzoylperoxy)hexane, 2,5-dimethyl-2,5-di(t-butylperoxy) hexine-3, di-t-butyl peroxide, di-t-butylperoxy-3,3,5-trimethylcyclohexane and t-butyl hydroperoxide. Of these organic peroxides exemplified above, preferred are dicumyl peroxide, di-t-butyl peroxide and di-t-butylperoxy-3,3,5-trimethylcyclohexane. The organic peroxide is used in an amount, based on 100 g of the present higher α-olefin copolymer, of $3 \times 10^{-4} - 5 \times 10^{-2}$ mole, preferably $1 \times 10^{-3} - 3 \times 10^{-2}$ mole.

The sulfur compounds as vulcanizing agents are used desirably in combination with vulcanizing accelerators. Concrete examples of the vulcanizing accelerators are thiazole compounds such as N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl) mercapto benzothiazole, 2-(2,6-diethyl-4-morpholinothio) benzothiazole and dibenzothiazyl disulfide; guanidine compounds such as diphenylguanidine, triphenylguanidine, diorthotolylguanidine, orthotolyl biguanide and diphenylguanidinephthalate; aldehydeamine or aldehyde-ammonia compounds such as acetaldehyde-aniline reaction products, butylaldehydeaniline condensates, hexamethylenetetramine and acetaldehyde ammonia; imidazoline compounds such as 2-mercaptoimidazoline; thiourea compounds such as thiocarbanilide, diethylthiourea, dibutylthiourea, trimethylthioruea and diorthotolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; dithionate compounds such as zinc dimethyldithiocarbamate, zinc diethyldithiocarbamate, zinc di-n-butyldithiocarbamate, zinc ethylphenyldithiocarbamate, sodium dimethyldithiocarbamate, selenium dimethyldithiocarbamate and tellurium diethyldithiocarbamate; xanthate compounds such as zinc dibutylxanthogen; and zinc white. These vulcanizing accelerators are used in an amount, based on 100 parts by weight of the higher α-olefin copolymer, of 0.1-20 parts by weight, preferably 0.2-10 parts by weight.

The organic peroxides as vulcanizing agents are desirably used in combination with vulcanizing assistants. Concrete examples of the vulcanizing assistants used are sulfur; quinone dioxime compounds such as p-quinonedioxime; methacrylate compounds such as polyethylene glycol dimethacrylate; allyl compounds such as diallyl phthalate and triallyl cyanurate; maleimide compounds; and divinylbenzene. The vulcanizing assistants as exemplified above are used in an amount, based on 1 mole of the organic peroxide used, of ½–2 moles, preferably about equimolar amount.

When the vulcanization is carried out using electron rays without using the vulcanizing agents, the molded unvulcanized compound rubber as will be mentioned later may be irradiated with electron rays having an energy of 0.1-10 MeV (megaelectron volt), preferably 0.3-2.0 MeV so that the absorbed dose applied becomes 0.5-35 Mrad (megarad), preferably 0.5-10 Mrad. In this case, the vulcanizing agents in combination with the vulcanizing assistants may be used, together with the irradiation with the electron rays, in an amount, based on 100 g of the present higher α-olefin copolymer, of $1 \times 10^{-4} - 1 \times 10^{-1}$ mole, preferably $1 \times 10^{-3} - 3 \times 10^{-2}$ mole.

The unvulcanized compound rubber is prepared in the following manner. That is, the present higher α-olefin copolymer, a filler and a softening agent are kneaded at a temperature of 80°-170° C. for 3-10 minutes by means of mixers such as a Banbury mixer. The kneadate thus obtained is mixed with the vulcanizing agent and, if necessary, with the vulcanizing accelerator or vulcanizing assistant, the mixture is kneaded at a roll temperature of 40°-80° C. for 5-30 minutes by using rolls such as an open roll and then rolled into a compound rubber in a ribbon-like or sheet-like form.

The compound rubber thus prepared is molded by means of an extrusion molding machine, calendering roll or press into a desired shape, introduced either simultaneously with the molding thereof or after the completion of the molding thereof into a vulcanizing tank, and then heated at a temperature of 150°-270° C. for 1-30 minutes or irradiated with the electron rays in the above-mentioned procedure to obtain a vulcanization product. The molding and vulcanizing processes are carried out usually by a continuous manner when a mold is not used. The heating means employed in the vulcanizing tank are such as hot air, glass bead fluidized bed, UHF (ultrashort electromagnetic wave), steam, etc.

When the vulcanization is carried out by irradiation with the electron rays, the compound rubber to be vulcanized is of course that which is not loaded with the vulcanizing agent.

The rubber vulcanization products as prepared in the manner mentioned above can be used, as they are, in various uses including automotive industry parts such as rubber vibration insulators and covering materials for tire vibrating portion, industrial rubber products such as rubber rolls and belts, electrical insulating materials, building industry products, rubber-coated fabrics, etc. If the above-mentioned unvulcanized compound rubber loaded with a foaming agent is foamed by heating, a foamed material is obtained, which is used as a heat insulating material, cushion material and sealing material, and it is also possible to improve impact resistance of resins such as polyolefin, polyamide, polyester and polycarbonate by incorporating said rubber vulcanization products into these resins.

Hereinafter, the first vulcanizable rubber compositions of the present invention are illustrated.

The first vulcanizable rubber composition of the invention comprises higher α-olefin copolymer rubber (1) as mentioned above and diene rubber (2).

Higher α-olefin copolymer rubber

The higher α-olefin copolymer rubber (1) used in the present invention is derived from higher α-olefin and non-conjugated diene.

The higher α-olefin used in the invention includes α-olefins of 6–12 carbon atoms such as hexene-1, heptene-1, octene-1, nonene-1, decene-1, undecene-1 and dodecene-1, which may be used either singly or in admixture of two or more. Of these higher α-olefins as exemplified above, preferably used are hexene-1, octene-1 and decene-1.

The content of units derived from the higher α-olefin constituting the higher α-olefin copolymer rubber (1) used in the invention is 70–99.99 moles, preferably 80–99.9 moles.

The non-conjugated diene used in the invention includes those represented by the following general formula [I].

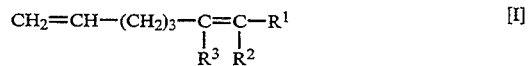

wherein $R^1$ represents alkyl of 1–4 carbon atoms, and $R^2$ and $R^3$ each represent hydrogen atom or alkyl of 1–4 carbon atoms, provided that under no circumstances both $R^2$ and $R^3$ are hydrogen atoms.

Concrete examples of the non-conjugated diene mentioned above are 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene and 6-methyl-1,6-undecadiene.

Of the above-exemplified non-conjugated dienes, particularly useful is 7-methyl-1,6-octadiene.

In addition to the non-conjugated dienes as mentioned above, other copolymerizable monomers such as ethylene, propylene, butene-1, pentene-1 and 4-methyl-pentene-1 may be used in the invention so long as the use of these compounds shall not hinder the present invention from accomplishing its objects.

The higher α-olefin copolymer rubber (1) used in the invention has an iodine value of 1–50, preferably 2–30 and especially 4–20. Generally, when the iodine value of the higher α-olefin copolymer rubber (1) is excessively high, the resulting rubber composition tends to become small in elongation and become brittle. On the other hand, when the iodine value of the higher α-olefin copolymer rubber (1) is excessively low, the resulting rubber composition becomes low in rate of vulcanization and comes to have no practical use.

An intrinsic viscosity [η], as measured in decahydronaphthalene at 135° C., of the higher α-olefin copolymer rubber (1) used in the invention is 1.0–10.0 dl/g, preferably 2.0–9.0 dl/g and especially 3.0–8.0 dl/g. When this intrinsic viscosity [η] exceeds 10.0 dl/g, the resulting rubber composition tends to have difficulty in processing the same, and on the other hand, if this intrinsic viscosity [η] becomes less than 1.0 dl/g, the resulting rubber composition tends to decrease in strength characteristics.

The vulcanizable rubber compositions of the present invention have improved weathering resistance and ozone resistance and are free from deterioration of resistance to dynamic fatigue or adhesion to fiber. Though the reason therefore is not ascertained yet, it is considered ascribable to the fact that the above-mentioned higher α-olefin copolymer rubber (1) is saturate hydrocarbon type rubber and high in affinity for various composite materials contained therein.

The content of units derived from the non-conjugated diene constituting the higher α-olefin copolymer rubber (1) used in the invention is 0.01–30 mol %, preferably 0.1–20 mol %.

The composition of the higher α-olefin copolymer rubber (1) is determined by $^{13}$C-NMR analysis.

The higher α-olefin copolymer rubber (1) used in the invention may be prepared, for example, by the same process as employed in the preparation of the higher α-olefin copolymers of the invention.

In the copolymerization (main polymerization) of higher α-olefin and non-conjugated diene, however, the solid titanium catalyst component [A] is used in an amount, based on 1 liter of the polymerization volume, of usually about from 0.001 to about 1.0 mmole, preferably from about 0.005 to about 0.1 mmole. The amount of the metal atoms present in the organoaluminum compound catalyst component [B] is usually about 1–2000 moles, preferably about 5–500 moles based on 1 mole of titanium atom present in the solid titanium catalyst component [A]. The electron donor catalyst component [C] is used in an amount, based on 1 mole of the metal atoms present in the organoaluminum compound catalyst component [B], of usually about 0.001–10 moles, preferably about 0.01–2 moles and especially about 0.05–1 mole.

At the time of carrying out the main polymerization, a molecular weight of the resulting polymer can be modified by the addition of hydrogen to the system.

The temperature at which higher α-olefin and non-conjugated diene are polymerized is preset usually to about 20°–200° C., preferably about 40°–100° C., and the pressure employed is preset usually to normal pressure to 100 kg/cm$^2$, preferably normal pressure to 50 kg/cm$^2$. The copolymerization (main polymerization) of higher α-olefin and non-conjugated diene may be carried out by any of batch-wise, semi-continuous and continuous methods. The polymerization may also be carried out in two stages or more while varying the reaction conditions.

Diene rubber (2)

The diene rubber (2) used in the present invention is known diene rubber such as natural rubber (NR), isoprene rubber, SBR, BR, CR or NBR.

Useful natural rubber is generally a specification material defined by Green Book (International Standard for Quality and Package of Natural Rubber of various grades).

Isoprene rubber used includes those having a specific gravity of 0.91–0.94 and Mooney viscosity [ML$_{1+4}$(100° C.)] of 30–120, and SBR used includes those having a specific gravity of 0.91–0.98 and Mooney viscosity [ML$_{1+4}$(100° C.)] of 20–120. BR used includes those having a specific gravity of 0.90–0.95 and Mooney viscosity [ML$_{1+4}$(100° C.)] of 20–120.

The diene rubber as illustrated above may be used, in the invention, either singly or in admixture of two or more.

Of the diene rubber exemplified above, preferably used is natural rubber, isoprene rubber, SBR, BR or a mixture thereof.

The vulcanization products obtained from the vulcanizable rubber compositions of the present invention are high in strength. The reason therefor is considered ascribable to the fact that a molecular chain of the diene rubber (2) is long.

Blending proportion

The blending proportion of the higher α-olefin copolymer rubber (1) to the diene rubber (2) in the first vulcanizable rubber composition of the present invention, in terms of the weight ratio [(1)/(2)], is 5/95–95/5, preferably 10/90–90/10 and especially 20/80–80/20.

The rubber composition of the invention may be loaded with carbon black such as SRF, GPF, FEF, HAF, ISAF, SAF, FT and MT, reinforcing agents such as ground silicic acid and fillers such as light calcium carbonate, heavy calcium carbonate, talc and clay. The kind and amount of these reinforcing agents and fillers used may be suitably selected according to the purpose for which the rubber composition is used, and these additives may be used in an amount, based on 100 parts by weight of the sum of the higher α-olefin copolymer rubber (1) and diene rubber (2), of not exceeding 300 parts by weight, preferably not exceeding 200 parts by weight.

The rubber compositions of the present invention in an unvulcanized state may be used as they are, but they exhibit their characteristics to the fullest extent when they are used as vulcanization products. That is, the higher α-olefin copolymer rubber (1) constituting the rubber composition of the invention has a function to improve the vulcanization products formed from the present rubber composition in their characteristics such as weathering resistance and ozone resistance, and the diene rubber (2) has a function to improve said vulcanization products in their characteristics such as strength, and hence the present rubber compositions can give the vulcanization products excellent in strength, weathering resistance, ozone resistance and resistance to dynamic fatigue, and also excellent in adhesion to fiber.

When the vulcanization products are obtained from the rubber compositions of the invention, there may suitably be selected, according to the intended use and performance of said vulcanization products, besides the higher α-olefin copolymer (1) and diene rubber (2), the kind and amount of reinforcing agents, fillers and softening agents used, the kind and amount of compounds used for constituting the vulcanization system such as vulcanizing agents, vulcanizing accelerators, vulcanizing assistants, antioxidants and processing assistants, and the step of preparing said vulcanization products.

The amount occupied by the sum of the higher α-olefin copolymer (1) and diene rubber (2) in the vulcanization product may be suitably selected according to the intended performance and use of said vulcanization product, however, said amount is usually at least 20% by weight, preferably at least 25% by weight.

The softening agents used are those commonly used in rubber, for example, petroleum type softeners such as process oil, lubricating oil, paraffin, liquid paraffin, petroleum asphalt and vaseline; coal tar type softeners such as coal tar, and coal tar pitch; fatty oil type softeners such as castor oil, linseed oil, rapeseed oil and coconut oil; tall oil; factice; waxes such as beeswax, carnauba wax and lanolin; fatty acids and fatty acid esters such as ricinolic acid, palmitic acid, barium stearate, calcium stearate and zinc laurate; and synthetic high molecular substances such as petroleum resins, atactic polypropylene and coumarone-indene resins. Of these softeners exemplified above, preferably used are petroleum type softeners, especially process oil. The amount of these softeners used may suitably selected according to the purpose for which the resulting vulcanization product is used, and is usually of not exceeding 150 parts by weight, preferably not exceeding 100 parts based on 100 parts by weight of the sum of the higher α-olefin copolymer rubber (1) and diene rubber (2).

The vulcanization products may be prepared from the first vulcanizable rubber compositions of the present invention by the same procedure as employed in the case of vulcanization of common rubber, wherein unvulcanized compound rubber is first prepared by the procedure as will be mentioned later, and the unvulcanized compound rubber is molded into a desired shape, followed by vulcanization. The vulcanization may be carried out by heating the unvulcanized compound rubber with the aforementioned vulcanizing agents or irradiating said compound rubber with electron rays.

The vulcanizing agents used may be the aforementioned sulfur compounds and organic peroxides. Particularly, when the sulfur compounds are used as vulcanizing agents, the vulcanized rubber composition of the invention exhibits its performance to the fullest extent. Preferably useful as the sulfur compound is sulfur. The sulfur compounds as the vulcanizing agents are used in an amount, based on 100 parts by weight of the sum of the higher α-olefin copolymer rubber (1) and diene rubber (2), of 0.1–10 parts by weight, preferably 0.5–5 parts by weight.

When the sulfur compounds are used as the vulcanizing agents, they are desirably used in combination with the aforementioned vulcanizing accelerators. The vulcanizing accelerators are used in an amount, based on 100 parts by weight of the sum of the higher α-olefin copolymer rubber (1) and diene rubber (2), of 0.1–20 parts by weight, preferably 0.2–10 parts by weight.

Where the vulcanization is carried out by irradiation with electron rays, the molded unvulcanized compound rubber as will be mentioned later may be irradiated with the electron rays having an energy of 0.1–10 MeV (megaelectron volt), preferably 0.3–2.0 MeV so that the absorbed dose becomes 0.5–35 Mrad (megarad), preferably 0.5–10 Mrad.

The unvulcanized compound rubber may be prepared by the following procedure. That is, a mixture of the higher α-olefin copolymer rubber (1), diene rubber (2), filler and softener is kneaded for 1–10 minutes at a temperature of 80°–170° C. by means of mixers such as a Bunbury mixer, the resulting kneadate is mixed additionally with the vulcanizing agent and, if necessary, the vulcanizing accelerator or vulcanizing assistant, by means of rolls such as an open roll, kneaded for 5–30 minutes at a roll temperature of 40°–80° C. and then rolled into a compound rubber in a ribbon-like or sheet-like form.

Where natural rubber is used as the diene rubber (2), the affinity of the natural rubber for the reinforcing agent and filler is improved when the natural rubber has been subjected beforehand to mastication.

The compound rubber thus prepared is molded into a desired shape by means of an extrusion molding machine, injection molding machine, calender roll or press, the resulting shaped compound rubber is introduced, either simultaneously with the molding or after the completion of the molding, into a vulcanization tank, and heated for 1–30 minutes at a temperature of 150°–250° C. or irradiated with electron rays to obtain a vulcanization product. This vulcanization step may be carried out by using or not using a mold.

The vulcanization products thus prepared may be used widely for tires, automotive parts, industrial parts in general, and building industry products. In particular, the vulcanization products may be used suitably for such purposes as requiring resistance to dynamic fatigue, for example, tire side wall, rubber vibration insulator, rubber roll, belt, wiper blade and various packings.

Hereinafter, the second vulcanizable rubber compositions of the present invention are illustrated.

The second vulcanizable rubber compositions of the invention comprises the above-mentioned higher α-olefin copolymer rubber (1) and ethylene/α-olefin copolymer rubber (3).

This vulcanizable rubber compositions have improved vibration-damping properties and improved resistance to dynamic fatigue. Though the reason therefor is not ascertained yet, it is considered that the second vulcanizable rubber compositions of the invention exhibit vibration-damping properties owing to a relaxing behavior specific to the above-mentioned α-olefin copolymer rubber (1) and improved in resistance to dynamic fatigue because of a high affinity of this higher α-olefin copolymer rubber (1) for various additives contained in said rubber compositions.

Ethylene/α-olefin copolymer rubber

The ethylene/α-olefin copolymer rubber (3) used in the present invention is derived from ethylene and α-olefin, however, this copolymer rubber (3) may further contain polyene components as its constituents.

The above-mentioned α-olefin has 3-6 carbon atoms and includes concretely propylene, 1-butene, 1-pentene, 4-methyl-1-pentene, 1-hexene. Of these α-olefins, preferably used are propylene and 1-butene.

The molar ratio (ethylene/α-olefin) of ethylene to olefin constituting the ethylene/α-olefin copolymer rubber (3) used in the invention is 50/50-95/5, preferably 55/45-93/7 and especially 60/40-91/9.

The above-mentioned polyene components used are non-conjugated polyenes and include concretely 1,4-hexadiene, 5-ethylidene-2-norbornene, 5-vinyl-2-norbornene, 5-isopropenyl-2-norbornene and dicyclopentadiene. Of these polyenes, preferred are 5-ethylidene-2-norbornene and dicyclopentadiene.

The content of units derived from these non-conjugated polyene is such an amount that the copolymer has 1-50, preferably 4-40 and especially 6-30 in terms of iodine value, and 0.1-10 mol %, preferably 0.5-7 mol % and especially 1-5 mol % in terms of mol %.

The ethylene/α-olefin copolymer rubber (3) used in the invention has an intrinsic viscosity $[\eta]$, as measured in decahydronaphthalene at 135° C., of 0.8-5 dl/g, preferably 0.9-4 dl/g and especially 1.0-3 dl/g. If the above-mentioned intrinsic viscosity $[\eta]$ exceeds 5 dl/g, the resulting rubber composition tends to involve difficulty in processing the same and, on the other hand, if the intrinsic viscosity $[\eta]$ is less than 0.8 dl/g, the resulting rubber composition tends to deteriorate in strength characteristics.

The vulcanizable rubber compositions of the present invention are high in strength, and the reason therefor is considered ascribable to the fact that the ethylene/α-olefin copolymer rubber (3) contained therein has a long molecular chain length.

Blending proportion

The blending proportion, in terms of weight ratio [(1)/(3)], of the higher α-olefin copolymer rubber (1) to ethylene/α-olefin copolymer rubber (3) constituting the second vulcanizable rubber composition of the present invention is 5/95-95/5, preferably 10/90-90/10 and especially 20/80-80/20.

The rubber compositions of the invention may be loaded with carbon black such as SRF, GPF, FEF, HAF, ISAF, SAF, FT and MT, reinforcing agents such as ground silicic acid, and fillers such as light calcium carbonate, heavy calcium carbonate, talc and clay. The kind and amount to be loaded of these reinforcing agents and fillers may be suitably selected according to the purpose for which the rubber composition is used, and the amount of these additives loaded is usually not exceeding 300 parts by weight, preferably not exceeding 200 parts by weight based on 100 parts by weight of the sum of the higher α-olefin copolymer rubber (1) and ethylene/α-olefin copolymer rubber (3).

The second vulcanizable rubber compositions of the invention may be used in an unvulcanized state, as they are, but they exhibit their characteristics to the fullest extent when they are used as vulcanization products. That is, the higher α-olefin copolymer rubber (1) constituting the rubber composition of the invention has a function to improve the vulcanization products in their characteristics such as vibration-damping properties and resistance to dynamic fatigue and the ethylene/α-olefin copolymer rubber (3) has a function to improve the vulcanization products in their characteristics such as strength and the like. From the rubber compositions of the invention, therefore, the vulcanization products excellent in strength characteristics, vibration-damping properties and resistance to dynamic fatigue can be obtained.

When the vulcanization products are obtained from the second vulcanizable rubber compositions of the invention, there may suitably be selected, according to the intended use and performance of said vulcanization products, besides the higher α-olefin copolymer rubber (1) and ethylene/α-olefin copolymer rubber (3), the kind and amount of reinforcing agents, fillers and softening agents to be loaded, the kind and amount of compounds used for constituting the vulcanization system such as vulcanizing agent, vulcanizing accelerators and vulcanizing assistants, the kind and amount of antioxidants and processing assistants to be loaded, and the step of preparing said vulcanization products.

The amount occupied by the sum of the higher α-olefin copolymer rubber (1) and ethylene/α-olefin copolymer rubber (3) in the vulcanization product may be suitably selected according to the intended performance and use of said vulcanization product, however, said amount is usually at least 20% by weight, preferably at least 25% by weight.

The softening agents used are softeners commonly used in rubber, for example, such as those mentioned hereinbefore. Of the softeners, preferably used are petroleum softeners. The amount of these softeners to be loaded may be suitably selected according to the purpose for which the vulcanization product is used, and said amount is usually of not exceeding 150 parts by weight, preferably not exceeding 100 parts by weight based on 100 parts by weight of the sum of the higher α-olefin copolymer rubber (1) and ethylene/α-olefin copolymer rubber (3).

The vulcanization products may be prepared from the second vulcanizable rubber compositions of the invention by first preparing an unvulcanized compound rubber in the same manner as in the case of preparing the vulcanization products from the first vulcanizable rubber compositions of the invention, and molding the unvulcanized compound rubber into a desired shape, followed by vulcanization. The vulcanization may be carried out by heating with the vulcanizing agents or by irradiating with electron rays.

The vulcanizing agents used in carrying out the vulcanization of the unvulcanized compound rubber are the aforementioned sulfur compounds and organic peroxides. The sulfur compounds are used in an amount, based on 100 parts by weight of the sum of the higher α-olefin copolymer rubber (1) and ethylene/α-olefin copolymer rubber (3), of 0.1-10 parts by weight, preferably 0.5-5 parts by weight. The organic peroxides are used in an amount, based on 100 g of the sum of the higher α-olefin copolymer rubber (1) and ethylene/α-olefin copolymer rubber (3), of $3 \times 10^{-4} - 5 \times 10^{-2}$ mole preferably $1 \times 10^{-3} - 3 \times 10^{-2}$ mole.

The sulfur compounds as the vulcanizing agents are desirably used in combination with the aforementioned vulcanizing accelerators. The vulcanizing accelerators are used in an amount of 0.1-20 parts by weight, preferably 0.2-10 parts by weight based on 100 parts by weight of the sum of the higher α-olefin copolymer rubber (1) and ethylene/α-olefin copolymer rubber (3).

The organic peroxide as the vulcanizing agents are desirably used in combination with the aforementioned vulcanizing assistants. The vulcanizing assistants are used in an amount of $\frac{1}{2}$–2 moles per mole of the organic peroxide used, preferably about equimolar amount of said organic peroxide.

Where the vulcanization is carried out by using electron rays without using the vulcanizing agents, the unvulcanized compound rubber as will be mentioned later may be irradiated with the electron rays having an energy of 0.1–10 MeV (megaelectron volt), preferably 0.3–2.0 MeV so that the absorbed dose becomes 0.5–35 Mrad (megarad), preferably 0.5–10 Mrad. In this case, the organic peroxides as the vulcanizing agents may be used in combination with the vulcanizing assistants in an amount, based on 100 g of the sum of the higher α-olefin copolymer rubber (1) and ethylene/α-olefin copolymer rubber (3), of $1 \times 10^{-4} \sim 1 \times 10^{-1}$ mole, preferably $1 \times 10^{-3} \sim 3 \times 10^{-2}$ mole.

The unvulcanized compound rubber is prepared in accordance with the aforementioned procedure illustrated in the case of preparing the first vulcanizable rubber composition of the present invention. That is, a mixture of the higher α-olefin copolymer rubber (1), ethylene/α-olefin copolymer rubber (3), filler and softener is kneaded for 3–10 minutes at a temperature of 80°–170° C. by means of mixers such as a Banbury mixer, the kneadate obtained is then mixed with the vulcanizing agent and, if necessary, with the vulcanizing accelerator or vulcanizing assistant, by means of rolls such as an open roll and kneaded for 5–30 minutes at a roll temperature of 40°–80° C., and the kneadate obtained is rolled into a compound rubber in the ribbon-like or sheet-like form.

The compound rubber thus prepared is molded into a desired shape by means of an extrusion molding machine, calender roll or press, and the shaped compound rubber is introduced, either simultaneously with the molding thereof or after the molding thereof, into a vulcanization tank and heated for 1–30 minutes or irradiated with the electron rays in the above-mentioned manner to obtain a vulcanization product. This vulcanization stage may be carried out by using a mold or not using the same. When the mold is not used, the vulcanization step is carried out usually in a continuous manner. The shaped compound rubber may be heated in the vulcanization tank by such heating means as hot air, glass bead fluidized bed, UHF (ultrashort electromagnetic wave) or steam.

When the vulcanization is carried out with irradiation of electron rays, the compound rubber used is, of course, that has not been loaded with the vulcanizing agent.

The rubber vulcanization products thus prepared may be used, as they are, for various applications, for example, automotive parts such as rubber vibration insulator and covering materials for tire vibrating section, industrial rubber products such as rubber roll and belt, electrical insulating materials, building industry products and rubber coated fabrics. In particular, the rubber vulcanization products may be used suitably for such purposes as requiring vibration-damping properties and resistance to dynamic fatigue, for example, rubber vibration insulator, rubber roll, belt, tire and wiper blade.

The second vulcanizable rubber compositions of the present invention may be formed into foamed articles by loading with foaming agents and if necessary with foaming assistants.

The foaming agents used in that case may include, for example, inorganic foaming agents such as sodium bicarbonate, sodium carbonate, ammonium bicarbonate, ammonium carbonate and ammonium nitrite; nitroso compounds such as N,N'-dimethyl-N,N'-dinitrosoterephthalamide and N,N'-dinitrosopentamethylene tetraamine; azo compounds such as azodicarboxamide, azobisisobutyronitrile, azocyclohexylnitrile, azodiaminobenzene and barium azodicarboxylate; sulfonylhydrazide compounds such as benzenesulfonyl hydrazide, toluenesulfonyl hydrazide, p,p'-oxybis(benzenesulfonylhydrazide) and diphenylsulfone-3,3'-disulfonyl hydrazide; and azide compounds such as calcium azide, 4,4'-diphenyldisulfonylazide and p-toluenesulfonylazide. Of these foaming agents as exemplified above, preferably used are nitroso compounds, azo compounds and azide compounds. The foamed articles having an apparent gravity of 0.03–0.7 may be prepared by loading the vulcanizable rubber composition of the invention with the foaming agent as exemplified above in an amount, based on 100 parts by weight of the sum of the higher α-olefin copolymer rubber (1) and ethylene/α-olefin copolymer rubber (3) present in said rubber composition, of 0.5–30 parts by weight, preferably 1–20 parts by weight. The foaming assistants as referred to above are additives having a function to lower the decomposition temperature of the foaming agent, accelerate the decomposition of said foaming agent and uniform the resulting cells, and such foaming assistants used include, for example, organic acids such as salicyclic acid, phthalic acid and stearic acid, and urea and derivatives thereof.

The foamed articles prepared from the second vulcanizable rubber compositions of the invention may be used for such application as heat insulators, air-supported materials, cushioning materials and soundproofing materials.

EFFECT OF THE INVENTION

From the higher α-olefin copolymers of the present invention, there can be obtained vulcanization products excellent in weathering resistance, ozone resistance, heat aging characteristics, low-temperature characteristics and vibration-damping properties, and also excellent in resistance to dynamic fatigue.

In accordance with the process of the invention, there can be prepared efficiently higher α-olefin copolymers having such effects as mentioned above in high yields.

The first vulcanizable rubber compositions of the invention containing a specific higher α-olefin copolymer rubber (1) and diene rubber (2) in a specific proportion have such effects that they are excellent in processability, strength characteristics, weathering resistance, ozone resistance and resistance to dynamic fatigue, and also excellent in adhesion to fiber, said vulcanizable rubber compositions being capable of providing vulcanization products having the above-mentioned effects.

The vulcanization products obtained from the first vulcanizable rubber compositions of the invention have such effects as mentioned above, and hence they are widely used for such applications as tires, automotive parts, general industrial products and building industry products. In particular, these vulcanization products are used suitably for such applications as requiring resistance to dynamic fatigue, for example, tire tread, carcass, side wall, rubber vibration insulator, rubber roll, belt, wiper blade and various packings.

The second vulcanizable rubber compositions of the invention containing a specific higher α-olefin copolymer rubber (1) and ethylene/α-olefin copolymer rubber (3) in a specific proportion have such effects that they are excellent in strength characteristics, heat resistance, weathering resistance, vibration-damping properties, vibration-deadening properties and resistance to dynamic fatigue, said vulcanizable rubber compositions being capable of providing vulcanization product having the above-mentioned effects.

The vulcanization products obtained from the second vulcanizable rubber compositions of the invention have such effects as mentioned above, and hence they are used, as they are, for applications, for example, automotive parts such as rubber vibration insulator and covering material for tire vibrating section, industrial rubber products such as rubber roll and belt, electrical insulating materials, building industry products and rubber coated fabrics. In particular, these vulcanization products are used suitably for such specific applications as requiring vibration-damping properties and resistance to dynamic fatigue, for example, rubber vibration insulator, rubber roll, belt, tire and wiper blade.

The foamed articles prepared from the second vulcanizable rubber compositions of the invention can be used for such applications as heat insulating materials, air-supported materials, cushioning materials and soundproofing materials.

The present invention is illustrated below with reference to examples, but it should be construed that the invention is in no way limited to those examples.

EXAMPLE 1

Preparation of solid titanium catalyst component [A]

A mixture of 95.2 g of anhydrous magnesium chloride, 442 ml of decane and 390.6 g of 2-ethylhexyl alcohol was allowed to undergo reaction at 130° C. for 2 hours to obtain a homogeneous solution. This solution was incorporated with 21.3 g of phthalic anhydride, and mixed with stirring at 130° C. for 1 hour to dissolve the phthalic anhydride in this homogeneous solution. After having been cooled to room temperature, 75 ml of the homogeneous solution thus obtained was poured in 200 ml of titanium chloride kept at −20° C. over a period of 1 hour. The mixture thus obtained was then elevated in temperature to 110° C. over a period of 4 hours, and at the time when the temperature reached 110° C., the mixture was incorporated with 5.22 g of diisobutyl phthalate and then held with stirring at that temperature for 2 hours. After the completion of the 2 hours reaction, the solids portion was collected by hot filtration which was then suspended in 275 ml of titanium chloride, and the suspension was allowed to undergo reaction again at 110° C. for 2 hours. After the completion of the reaction, the solids portion was collected again by hot filtration and was then washed thoroughly with decane and hexane at 110° C. until no free titanium compound was detected any longer during the washing operation. The solid titanium catalyst component [A] prepared by the above-mentioned operations was preserved at a slurry, and a part of this slurry was dried for the purpose of determining the catalyst composition. The solid titanium catalyst component [A] thus obtained contained 2.2% by weight of titanium, 58.1% by weight of chlorine, 19.2% by weight of magnesium and 10.7% by weight of diisobutyl phthalate.

Polymerization

A 500 ml polymerizer equipped with an agitating element was charged with 142 ml of decane, 100 ml of octene-1 and 8 ml of 7-methyl-1,6-octadiene. Into this solution elevated in temperature to 50° C. were introduced continuously hydrogen and nitrogen at rates of 1 liter and 50 liters per hour, respectively. The polymerizer was then charged with 0.625 mmol of triisobutylaluminum, 0.21 mmol of trimethylethoxysilane and 0.0125 mmol, in terms of titanium atom, of the solid titanium catalyst component [A] to initiate polymerization. After a thirty-minute polymerization at 50° C., the polymerization was stopped by the addition of small amounts of isobutyl alcohol to the system, and the resulting polymer solution was then poured in large amounts of methanol to separate out a copolymer. The copolymer was recovered and dried at 120° C. under reduced pressure overnight to give 12.4 g of octene-1/7-methyl-1,6-octadiene copolymer. The intrinsic viscosity [$\eta$], as measured in decahydronaphthalene at 135° C., of the thus obtained copolymer was 6.4 dl/g, and the content of 7-methyl-1,6-octadiene in the copolymer was 6.6 mol %.

EXAMPLES 2–6

Copolymers as shown in Table 1 were obtained by repeating Example 1 except that the higher α-olefin used and the polymerization conditions employed were changed respectively to those as shown in Table 1.

COMPARATIVE EXAMPLE 1

A copolymer as shown in Table 1 was obtained by repeating Example 1 except that the copolymerization was carried out by using, as the catalysts, titanium trichloride (TAC-131, a product of Toho Titanium K.K.) and diethylaluminum chloride in amounts of 1.25 mmol and 2.5 mmol, respectively. The catalytic activity observed based on titanium, was low, and it was merely 0.7% of that observed in Example 1.

TABLE 1

| | Ti concn. mmol/l | Al concn. mmol/l | Third component | | Hydrogen l/hr | Nitrogen l/hr | Higher α-olefin | | MOD ml | Temp. °C. | Copolymer yield, g | [$\eta$] dl/g | MOD mol % |
| --- | --- | --- | --- | --- | --- | --- | --- | --- | --- | --- | --- | --- | --- |
| | | | | mmol/l | | | | ml | | | | | |
| | | iBu$_3$Al | | | | | | | | | | | |
| Ex. 1 | 0.05 | 2.5 | TMES | 0.83 | 1 | 50 | Octene-1 | 100 | 8 | 50 | 12.4 | 6.4 | 6.6 |
| Ex. 2 | 0.1 | 5 | TMES | 1.67 | 3 | 50 | Octene-1 | 100 | 20 | 50 | 24.6 | 4.5 | 15.1 |
| Ex. 3 | 0.05 | 2.5 | TMES | 0.83 | 3 | 50 | Octene-1 | 115 | 5 | 50 | 26.6 | 6.5 | 3.9 |
| Ex. 4 | 0.05 | 2.5 | TMES | 0.83 | 3 | 50 | Decene-1 | 100 | 10 | 50 | 11.1 | 3.6 | 11.2 |
| Ex. 5 | 0.05 | 2.5 | TMES | 0.83 | 3 | 50 | Hexene-1 | 100 | 10 | 50 | 11.3 | 3.5 | 8.2 |
| Ex. 6 | 0.05 | 2.5 | TMMS | 0.83 | 3 | 50 | Octene-1 | 100 | 5 | 50 | 15.7 | 4.1 | 8.6 |
| Compar. | 5.0 | Et$_2$AlCl | — | — | 3 | 50 | Octene-1 | 100 | 5 | 50 | 9.0 | 7.4 | 6.2 |

TABLE 1-continued

| | Ti concn. mmol/l | Al concn. mmol/l | Third component mmol/l | Hydrogen l/hr | Nitrogen l/hr | Higher α-olefin ml | MOD ml | Temp. °C. | Copolymer yield, g | [η] dl/g | MOD mol % |
|---|---|---|---|---|---|---|---|---|---|---|---|
| Ex. 1 | | 10 | | | | | | | | | |

MOD: 7-Methyl-1,6-octadiene
TMES: Trimethylethoxysilane
TMMS: Trimethylmethoxysilane
iBu₃Al: Triisobutylaluminum
Et₂AlCl: Diethylaluminum chloride
Polymerization conditions common to all) Polymerization time: 30 min., Solvent: Decane

EXAMPLE 7

Continuous copolymerization reaction of octene-1 with 7-methyl-1,6-octadiene was carried out using a 4-liter glass polymerizer equipped with an agitating element.

That is, to the polymerizer were continuously supplied through the top thereof a solution of octene-1 and 7-methyl-1,6-octadiene at a rate of 1 l/hr so that the concentration of octene-1 in the polymerizer became 155 g/l and that of 7-methyl-1,6-octadiene became 14 g/l, a decane slurry of the solid titanium catalyst component [A] at a rate of 0.4 l/hr so that the concentration of titanium became 0.05 mmol/l, a decane solution of triisobutylaluminum at a rate of 1 l/hr so that the concentration of aluminum became 2.5 mmol/l, and a decane solution of trimethylethoxysilane at a rate of 1.6 l/hr so that the concentration of silane in the polymerizer became 0.83 mmol/l. On one hand, from the polymerizer was continuously withdrawn through the bottom thereof a polymer solution so that the amount of the polymer solution in the polymerizer became always 2 liters. Furthermore, to the polymerizer were supplied through the top thereof hydrogen at a rate of 1 l/hr and nitrogen at a rate of 50 l/hr. The copolymerization reaction was carried out at 50° C. by circulating hot water through a jacket fitted to the outside of the polymerizer.

Subsequently, the polymer solution withdrawn from the polymerizer though the bottom thereof was charged with small amounts of methanol to stop the copolymerization reaction, and this polymer solution was poured in large amounts of methanol to separate out a copolymer. The copolymer thus separated was collected, washed thoroughly with methanol, and dried at 140° C. under reduced pressure overnight to obtain an octane-1/7-methyl-1,6-octadiene copolymer at a rate of 225 g/hr.

The content of units derived from 7-methyl-1,6-octadiene in the copolymer thus obtained was 7.2 mol %, and the intrinsic viscosity [η], as measured in decahydronaphthalene at 135° C., of said copolymer was 5.2 dl/g.

EXAMPLE 8

The octene-1/7-methyl-1,6-octadiene copolymer prepared in Example 1 was formed into a rubber composition containing its constituents as shown in Table 2. This rubber composition was then kneaded by means of an 8-inch open roll to obtain an unvulcanized compound rubber.

TABLE 2

| Composition | Part by weight |
|---|---|
| Octene-1/7-methyl-1,6-octadiene copolymer | 100.0 |
| Stearic acid | 1.0 |
| Zinc white | 5.0 |

TABLE 2-continued

| Composition | Part by weight |
|---|---|
| HAF carbon 1) | 50.0 |
| Naphthenic oil 2) | 10.0 |
| Vulcanizing accelerator A 3) | 0.5 |
| Vulcanizing accelerator B 4) | 0.5 |
| Sulphur | 0.5 |

1) Trade name: Asahi 70, a product of Asahi Carbon K.K.
2) Trade name: Sunsen 4240, a product of Nippon Sun Petroleum K.K.
3) Trade name: Sunceler-M, a product of Sanshin Kagaku K.K.
4) Trade name: Sunceler-TT, a product of Sanshin Kagaku K.K.

This compound rubber was heated for 20 minutes by means of a press heated at 160° C. to prepare a vulcanized sheet which was then subjected to the following tests. The tests conducted are itemized as in the following.

Test item

Tensile test, hardness test, aging test, flex test, vibration damping test, weathering test, ozone resistance test, and test for low-temperature characteristics.

Test method

The tensile test, hardness test, aging test and flex test were conducted according to JIS K 6301. That is, in the tensile test, tensile strength ($T_B$) and elongation ($E_B$) were measured, in the hardness test $H_S$ JIS A hardness was measured, and the aging test was conducted by means of hot-air aging at 120° C. for 70 hours. After the completion of the aging test, the tensile test was conducted to obtain retention of physical properties prior to aging, that is, retention of tensile strength $A_R$ ($T_B$) and retention of elongation $A_R$ ($E_B$). The flex test was conducted using a deMattia machine to investigate resistance to crack growth. That is, the number of flexing until the crack grows to 15 mm.

Using a dynamic spectrometer of Leometric Co., dissipation factor (tan δ) as an indication of vibration-damping properties was measured at 25° C. and 100 rad/sec.

Subsequently, weathering resistance was investigated using a sunshine weatherometer. The conditions under which the sunshine weatherometer was used were such that a temperature of a black panel was 63° C., a carbon arc was lighted, and water was sprayed for 18 minutes in a 120-minutes cycle. This cycle of the operation was continued for 200 hours, and thereafter the tensile test was conducted to obtain retention of tensile strength as well as of elongation based on those measured prior to the test.

The ozone resistance test was conducted according to JIS K 6301 under the circumstances of ozone concentration of 50 pphm, ambient temperature of 40° C. and draw ratio of 30% to observe deterioration in surface profile (investigate whether any crack was formed or not) after the lapse of 200 hours. The low-temperature characteristics were determined by obtaining an embrittle temperature in impact brittleness test conducted in accordance with JIS K 6301.

Results obtained are shown in Table 3.

EXAMPLE 9

Example 8 was repeated except that the copolymer used was that obtained in Example 2 to obtain a vulcanized sheet which was then put to the above-mentioned tests.

Results obtained are shown in Table 3.

EXAMPLE 10

Example 8 was repeated except that the copolymer used was that obtained in Example 4 to obtain a vulcanized sheet which was then put to the above-mentioned tests.

Results obtained are shown in Table 3.

EXAMPLE 11

Example 8 was repeated except that the copolymer used was that obtained in Example 5 to obtain a vulcanized sheet which was then put to the above-mentioned tests.

Results obtained are shown in Table 3.

COMPARATIVE EXAMPLE 2

Example 8 was repeated except that the copolymer used was a commercially available ethylene/propylene/diene copolymer (MITSUI EPT 3070, a product of Mitsui Petrochemical Industries, Ltd.) to obtain a vulcanized sheet which was then put to the above-mentioned tests.

Results obtained are shown in Table 3.

obtained was pelletized by means of a square pelletizer (manufactured by Horai Tekko K.K.), and the resulting pellets were injection molded into a sheet of 150 mm × 120 mm × 2 mm. The conditions under which the injection molding was carried out are as follows:

| | |
|---|---|
| Primary injection pressure | 1000 kg/cm$^2$, cycle 5 seconds |
| Secondary holding pressure | 800 kg/cm$^2$, cycle 5 seconds |
| Injection speed | 40 mm/sec |
| Resin temperature | 230° C. |

Using this sheet as a test specimen, yield stress (YS) and elongation at break (EL) were determined by the method stipulated in JIS K 6758, and Izod impact strength was determined in accordance with ASTM D 256 in an atmosphere of 23° C.

Results obtained are shown in Table 4.

COMPARATIVE EXAMPLE 3

Example 12 was repeated except that the higher α-olefin copolymer was not used and the polypropylene was injection molded, as it was, into a sheet.

Results obtained are shown in Table 4.

TABLE 4

| | Example 12 | Compar. Ex. 3 |
|---|---|---|
| Yield stress YS [kg/cm$^2$] | 310 | 370 |
| Elongation at break EL [%] | 690 | 690 |
| Izod impact strength [kg · cm/cm] | 10 | 3 |

EXAMPLE 13

Example 1 was repeated except that the polymeriza-

TABLE 3

| | Example 8 | Example 9 | Example 10 | Example 11 | Compar. Ex. 2 |
|---|---|---|---|---|---|
| Tensile test | | | | | |
| Tensile strength T$_B$ (kg/cm$^2$) | 125 | 130 | 118 | 135 | 185 |
| Elongation E$_B$ (%) | 520 | 450 | 550 | 540 | 510 |
| Hardness test | | | | | |
| Spring hardness H$_S$ JIS A | 53 | 55 | 51 | 54 | 66 |
| Aging test | | | | | |
| Retention of tensile strength A$_R$ (T$_B$) (%) | 94 | 98 | 95 | 96 | 93 |
| Retention of elongation A$_R$ (E$_B$) (%) | 80 | 81 | 77 | 83 | 71 |
| Flex test | | | | | |
| Number of flexing before crack growth (time) | at least 10$^5$ | at least 10$^5$ | at least 10$^5$ | at least 10$^5$ | not more than 10$^3$ |
| Vibration-damping properties | | | | | |
| Dissipation factor | 0.66 | 0.63 | 0.61 | 0.72 | 0.12 |
| Weathering resistance | | | | | |
| Retention of tensile strength A$_R$ (T$_B$) (%) | 100 | 110 | 100 | 95 | 98 |
| Retention of elongation A$_R$ (E$_B$) (%) | 92 | 90 | 95 | 93 | 96 |
| Ozone resistance | | | | | |
| Surface profile (cracked or not) | none | none | none | none | none |
| Low-temperature characteristics | | | | | |
| Embrittlement temperature | not more than −50° C. | not more than −50° C. | not more than −50° C. | not more than −50° C. | not more than −50° C. |

EXAMPLE 12

Using a B model Banbury mixer (manufactured by Kobe Steel, Ltd.) 80 parts by weight of polypropylene (Highpole J700, a product of Mitsui Petrochemical Industries, Ltd.), 20 parts by weight of the higher α-olefin copolymer prepared in Example 1 and 0.1 part by weight of 2,6-ditertiary-butyl-4-methylphenol were kneaded together at 190° C. for 3 minutes, and then rolled by means of an open roll into a sheet. The sheet tion conditions employed were changed to those shown in Table 5 to obtain 15.1 g of octene-1/7-methyl-1,6-octadiene copolymer. The copolymer thus obtained had an intrinsic viscosity [η], as measured in decahydronaphthalene at 135° C., of 3.0 dl/g, an iodine value (IV) of 20, and a molar ratio (octene-1/7-methyl-1,6-octadiene) of octene-1 to 7-methyl-1,6-octadiene of 91/9.

The polymerization conditions employed in this example are shown in Table 5.

TABLE 5

|  | Ti concn. mmol/l | Al concn. mmol/l iBu₃Al | Third component | mmol/l | Hydrogen l/hr | Nitrogen l/hr | Higher α-olefin | ml | MOD ml | Temp. °C. | Copolymer yield, g | [η] dl/g | IV |
|---|---|---|---|---|---|---|---|---|---|---|---|---|---|
| Example 13 | 0.05 | 2.5 | TMES | 0.83 | 10 | 50 | Octene-1 | 100 | 10 | 50 | 15.1 | 3.0 | 20 |
| Example 19 | 0.05 | 2.5 | TMES | 0.83 | 5 | 50 | Hexene-1 | 90 | 8 | 50 | 16.9 | 4.5 | 18 |
| Example 20 | 0.05 | 2.5 | TMES | 0.83 | 7 | 50 | Decene-1 | 110 | 14 | 50 | 13.7 | 4.0 | 23 |

MOD: 7-Methyl-1,6-octadiene
TMES: Trimethylethoxysilane
iBu₃Al: Triisobutylaluminum
Copolymerization conditions common to all) Polymerization time: 30 min., Solvent: Decane

Preparation of vulcanized rubber

There was prepared a blend in the usual way, said blend containing 30.0 parts by weight of the above-mentioned octene-1/7-methyl-1,6-octadiene copolymer rubber (1-a) as the higher α-olefin copolymer rubber (1), 70 parts by weight of commercially available natural rubber RSS1 [Malaysian product] (2-a) as the diene rubber (2), 5.0 parts by weight of zinc white No.1 (a product of Sakai Kagaku Kogyo K.K.), 1.0 part of stearic acid, 50.0 parts by weight of HAF carbon (Seast H, a product of Tokai Carbon K.K.), 5.0 parts by weight of naphthenic oil (Sunthene 4240, a product of Nippon Sun Petroleum K.K.), 2.2 parts by weight of sulfur, and 1.0 part by weight of DPG (Sanceler-D, a product of Sanshin Kagaku K.K.) and CBZ (San celer-CM, a product of Sanshin Kagaku K.K.) as the vulcanizing accelerators.

In preparing the above-mentioned blend, the natural rubber was masticated by means of a mill roll controlled at 40° C. so as to have a Mooney viscosity [$ML_{1+4}$(100° C.)] of 60.

Subsequently, the above-mentioned copolymer rubber (1-a), masticated natural rubber (2-a), zinc white, stearic acid, HAF carbon and naphthenic oil were kneaded together for 4 minutes by means of a 4.3 liter Banbury mixer, and then allowed to stand at room temperature for 1 day.

The thus obtained kneadate was mixed with the vulcanizing accelerators (DPG, CBZ) and sulfur by means of a 14-inch mill roll under such conditions as the mixing time on the mill roll of 4 minutes, the surface temperature of open mill front roll of 50° C., that of open mill back roll of 60° C., the number of revolution of open mill front roll of 16 rpm, and that of open mill back roll of 18 rpm.

Subsequently, the compound rubber thus obtained was rolled into a sheet, the sheet was pressed at 150° C. for 30 minutes to prepare a vulcanized sheet which was then put to the following tests.

Test item

Tensile test, hardness test, ozone resistance rest, flex test and adhesion test of the vulcanized sheet to polyester cord.

Test method

The tensile test, hardness test, ozone resistance test and flex test were conducted according to JIS K 6301. That is, the tensile, hardness and flex tests were carried out in the same manner as in Example 8. The ozone resistance test was carried out in an ozone resistance tank under such conditions as ozone concentration of 50 pphm, extension of 20% and atmosphere of 40° C. The ozone resistance was evaluated according to the standard stipulated in JIS K 6301 by inspecting the surface profile of the vulcanized sheet as tested. The results of evaluation are rated according to the following ratings, for example, the results are rated as "C-5".

Number of cracks:

A . . . Cracks formed are small in number
B . . . Cracks formed are large in number
C . . . Cracks formed are almost numberless Size and depth of cracks:

1 . . . Cracks that are invisible to the naked eye, but can be confirmed by the aid of a magnifying glass of 10 magnifications.
2 . . . Cracks that can be conformed by the naked eye
3 . . . Cracks that are deep and relatively large (less than 1 mm)
4 . . . Cracks that are deep and large (not less than 1 mm and less than 3 mm)
5 . . . Cracks that are not less than 3 mm or that are almost ready to give rise to breakage of the vulcanized sheet.

The adhesion test was carried out in accordance with the adhesion test method described in Japanese Patent L-O-P Publn. No. 13779/1983 to measure H adhesion force. That is, a mixture of 10.0 parts by weight of phenol blocked triphenylmethane triisocyanate ("Dresmodur R", a product of Bayer), 0.5 part by weight of Sanmorin OT (a dispersant of Sanyo Kasei K.K.), 1.0 part by weight of Marathperth DY (a dispersant of Marathon Co.) and 88.5 parts by weight of water was ground and dispersed for 24 hours by means of a ball mill to obtain a 10% aqueous blocked isocyanate dispersion. (This dispersion is called the liquid A hereinafter.)

Separately, a solution prepared by mixing together 18.5 parts by weight of resorcinol, 27.2 parts by weight of a 37% aqueous formalin solution, 5.0 parts by weight of a 10% aqueous caustic soda solution and 396.6 parts by weight of water was matured at 25° C. for 90 minutes. To this solution were then added 278.8 parts by weight of a 41% styrene/butadiene/vinyl pyridine latex ("Hiker-2518 FS", a product of Nippon Geon Co., Ltd.) and 142.0 parts by weight of a 40% SBR latex ("Nipol LX110", a product of Nippon Geon Co., Ltd.), and the solution was matured at 25° C. for 6 hours.

The thus prepared RFL liquid to which was added 530 parts by weight of an aqueous ammonia solution of 2,6-bis(2',4'-dihydroxyphenylmethyl)-4-chlorophenol ("Parcabond E", a product of Parnacs Co., a solid content of 20% by weight;) was matured further 25° C. for 30 hours. (This RFL liquid is called the liquid B hereinafter.)

Subsequently, 500 parts by weight of the liquid B was mixed with 1.1 parts by weight of the liquid A by stirring to obtain a liquid C. (The content of blocked isocyanate in the liquid C is 0.10% by weight based on the total solids content.)

Separately, three stretched yarns of polyethylene terephthalate, each 1000 deniers and 192 filaments, were twisted upward at a twist of 40 time/10 cm and downward at a twist of 40 time/10 cm to obtain a cord.

This cord immersed for 3 seconds in the liquid C was dried at 150° C. for 2 minutes while maintaining it at a standard length, and then heat treated at 235° C. for 90 seconds. The amount of the adhesive with which the polyester cord was impregnated was 5.8% based on the weight of the polyester cord.

The adhesive-treated cord thus obtained was embedded in the above-mentioned unvulcanized rubber blend, and the rubber blend was vulcanized at 150° C. for 30 minutes under a pressure of 100 kg f/cm$^2$ to obtain, in accordance with ASTM D 2138, H adhesion force in terms of adhesion force per 10 mm of the draw thickness of the cord.

Results obtained are shown in Table 6.

EXAMPLE 14

Example 13 was repeated except that the amounts of the copolymer rubber (1-a) and natural rubber (2-a) used were changed to 50 parts by weight and 50 parts by weight, respectively, to obtain a vulcanized sheet and a vulcanization product in which the adhesive-treated cord had been embedded. The vulcanization product thus obtained was put to the above-mentioned test.

Results obtained are shown in Table 6.

EXAMPLE 15

Example 13 was repeated except that the amounts of the copolymer rubber (1-a) and natural rubber (2-a) were changed to 70 parts by weight and 30 parts by weight, respectively, to obtain a vulcanized sheet and a vulcanization production which the adhesive-treated cord had been embedded. The vulcanization product thus obtained was put to the above-mentioned test.

Results obtained are shown in Table 6.

COMPARATIVE EXAMPLE 4

Example 13 was repeated except that 100 parts by weight of the natural rubber (2-a) was used alone without using the copolymer rubber (1-a) to obtain a vulcanized sheet and a vulcanization product in which the adhesive-treated cord had been embedded. The vulcanization product thus obtained was put to the above-mentioned test.

Results obtained are shown in Table 6.

COMPARATIVE EXAMPLE 5

Example 14 was repeated except that in place of the copolymer rubber (1-a), there was used an ethylene/propylene/5-ethylidene-2-norbornene copolymer rubber to obtain a vulcanized sheet and a vulcanization product in which the adhesive-treated cord had been embedded. The vulcanization product thus obtained was put to the above-mentioned test.

The above-mentioned ethylene/propylene/5-ethylidene-2-norbornene copolymer had the ethylene content of 70 mol %, an intrinsic viscosity [$\eta$], as measured in decahydronaphthalene at 135° C., of 2.5 dl/g and an iodine value (IV) of 20.

Results obtained are shown in Table 6.

EXAMPLE 16

Example 13 was repeated except that in place of the natural rubber (2-a), there was used SBR (2-b) [Nipol 1502, a product of Nippon Geon Co., Ltd.] to obtain a vulcanized sheet and a vulcanization product in which the adhesive-treated cord had been embedded. The vulcanization product thus obtained was put to the above-mentioned test.

Results obtained are shown in Table 6.

COMPARATIVE EXAMPLE 6

Example 16 was repeated except that 100 parts by weight of SBR (2-b) was used alone without using the copolymer rubber (1-a) to obtain a vulcanized sheet and a vulcanization product in which the adhesive-treated cord had been embedded. The vulcanization product thus obtained was put to the above-mentioned test.

Results obtained are shown in Table 6.

EXAMPLE 17

Example 13 was repeated except that in place of the natural rubber (2-a), there was used isoprene rubber (2-c) [Nipol IR 2200, product of Nippon Geon Co., Ltd.] to obtain a vulcanized sheet and a vulcanization product in which the adhesive-treated cord had been embedded. The vulcanization product thus obtained was put to the above-mentioned test.

Results obtained are shown in Table 6.

COMPARATIVE EXAMPLE 7

Example 17 was repeated except that 100 parts by weight of the isoprene rubber (2-c) was used alone without using the copolymer rubber (1-a) to obtain a vulcanized sheet and a vulcanization product in which the adhesive-treated cord had been embedded. The vulcanization product thus obtained was put to the above-mentioned test.

Results obtained are shown in Table 6.

EXAMPLE 18

Example 13 was repeated except that in place of the natural rubber (2-a), there was used BR (2-d) [Nipol BR 1220, a product of Nippon Geon Co., Ltd.] to obtain a vulcanized sheet and a vulcanization product in which the adhesive-treated cord had been embedded. The vulcanization product thus obtained was put to the above-mentioned test.

Results obtained are shown in Table 6.

COMPARATIVE EXAMPLE 8

Example 18 was repeated except that 100 parts by weight of the BR (2-d) was used alone without using the copolymer rubber (1-a) to obtain a vulcanized sheet and a vulcanization product in which the adhesive-treated cord had been embedded. The vulcanization product thus obtained was put to the above-mentioned test.

Results obtained are shown in Table 6.

EXAMPLE 19

Example 13 was repeated except that in place of octene-1/7-methyl-1,6-octadiene copolymer rubber (1-a), there was used hexene-1/7-methyl-1,6-octadiene copolymer rubber (1-b) obtained by copolymerization carried out under the polymerization conditions as shown in the above-mentioned Table 5 to obtained a vulcanized sheet and a vulcanization product in which the adhesive-treated cord had been embedded. The vulcanization product thus obtained was put to the above-mentioned test.

The above-mentioned hexene-1/7-methyl-1,6-octadiene copolymer rubber had an intrinsic viscosity [$\eta$] (135° C., decahydronaphthalene) of 4.5 dl/g and an iodine value (IV) of 18. In the copolymer, the content of units derived from hexene-1 was 94 mol % and the content of units derived from 7-methyl-1,6-octadiene was 6 mol %.

Results obtained are shown in Table 6.

EXAMPLE 20

Example 13 was repeated except that in place of octene-1/7-methyl-1,6-octadiene copolymer rubber (1-a), there was used decene-1/7-methyl-1,6-octadiene copolymer rubber (1-c) obtained by copolymerization carried out under the polymerization conditions as shown in the above-mentioned Table 5 to obtained a vulcanized sheet and a vulcanization product in which the adhesive-treated cord had been embedded.

The above-mentioned decene-1/7-methyl-1,6-octadiene copolymer rubber had an intrinsic viscosity $[\eta]$ (135° C., decahydronaphthalene) of 4.0 dl/g and an iodine value (IV) of 23. In the copolymer, the content of units derived from decene-1 was 88 mol % and the content of units derived from 7-methyl-1,6-octadiene was 12 mol %.

Results obtained are shown in Table 6.

EXAMPLE 21

Example 13 was repeated except that in place of 70 parts by weight of the natural rubber (2-a), there was used a mixed diene rubber containing 50 parts by weight of the natural rubber (2-a) and 20 parts by weight of SBR (2-b) to obtain a vulcanized sheet and a vulcanization product in which the adhesive-treated cord had been embedded. The vulcanization product thus obtained was put to the above-mentioned test.

Results obtained are shown in Table 6.

EXAMPLE 22

Example 13 was repeated except that in place of 70 parts by weight of the natural rubber (2-a), there was used a mixed diene rubber containing 50 parts by weight of the natural rubber (2-a) and 20 parts by weight of BR (2-d) to obtain a vulcanized sheet and a vulcanization product in which the adhesive-treated cord had been embedded. The vulcanization product thus obtained was put to the above-mentioned test.

Results obtained are shown in Table 6.

TABLE 6

| | Example 13 | Example 14 | Example 15 | Compar. Ex. 4 | Compar. Ex. 5 | Example 16 | Compar. Ex. 6 |
|---|---|---|---|---|---|---|---|
| Higher α-olefin copolymer rubber (1) | | | | | | | |
| α-olefin | Octene-1 | Octene-1 | Octene-1 | | Ethylene-propylene | Octene-1 | |
| Non-conjugated diene | MOD | MOD | MOD | | ENB | MOD | |
| Diene rubber (2) | NR | NR | NR | NR | NR | SBR | SBR |
| Tensile test | | | | | | | |
| Tensile strength $T_B$ [kg f/cm$^2$] | 181 | 150 | 132 | 248 | 165 | 190 | 256 |
| Elongation $E_B$ [%] | 400 | 390 | 410 | 440 | 410 | 430 | 460 |
| Hardness test | | | | | | | |
| Spring hardness [$H_s$ JIS A] | 54 | 52 | 50 | 59 | 66 | 54 | 60 |
| Ozone resistance | | | | | | | |
| Surface profile | No crack | No crack | No crack | Broken | No crack | No crack | C-5 |
| Resistance to dynamic fatigue | | | | | | | |
| Number of times before growth of crack [time] | at least 10$^5$ | at least 10$^5$ | at least 10$^5$ | at least 10$^5$ | 3 × 10$^3$ | at least 10$^5$ | 2 × 10$^4$ |
| Adhesion properties | | | | | | | |
| H-test [kg/cm] | 18.7 | 18.1 | 18.0 | 5.1 | 19.3 | 20.7 | |

| | Ex. 17 | Compara. Ex. 7 | Ex. 18 | Compar. Ex. 8 | Ex. 19 | Ex. 20 | Ex. 21 | Ex. 22 |
|---|---|---|---|---|---|---|---|---|
| Higher α-olefin copolymer rubber (1) | | | | | | | | |
| α-olefin | Octene-1 | | Octene-1 | | Hexene-1 | Decene-1 | Octene-1 | Octene-1 |
| Non-conjugated diene | MOD | | MOD | | MOD | MOD | MOD | MOD |
| Diene rubber (2) | IR | IR | Br | Br | NR | NR | NR+SBR | NR+BR |
| Tensile test | | | | | | | | |
| Tensile strength $T_B$ [kg f/cm$^2$] | 171 | 228 | 185 | 240 | 192 | 183 | 186 | 179 |
| Elongation $E_B$ [%] | 410 | 440 | 430 | 450 | 440 | 410 | 420 | 400 |
| Hardness test | | | | | | | | |
| Spring hardness [$H_s$ JIS A] | 53 | 57 | 52 | 57 | 53 | 52 | 53 | 51 |
| Ozone resistance | | | | | | | | |
| Surface profile | No crack | Broken | No crack | Broken | No crack | No crack | No crack | No crack |
| Resistance to dynamic fatigue | | | | | | | | |
| Number of times before growth of crack [time] | at least 10$^5$ | at least 10$^5$ | at least 10$^5$ | at least 10$^5$ | at least 10$^5$ | at least 10$^5$ | at least 10$^5$ | at least 10$^5$ |
| Adhesion properties | | | | | | | | |
| H-test [kg/cm] | 18.9 | 18.5 | 18.4 | 17.8 | 18.3 | 17.6 | 19.4 | 18.9 |

MOD: 7-Methyl-1,6-octadiene
ENB: 5-ethylidene-2-norbornene
NR: Natural rubber

EXAMPLE 23

Example 1 was repeated except that the polymerization conditions employed were changed to those shown in Table 7 to obtain 14.3 g of octene-1/7-methyl-1,6-octadiene copolymer. The copolymer thus obtained had an intrinsic viscosity $[\eta]$, as measured in decahydronaphthalene at 135° C., of 4.5 dl/g, an iodine value (IV) of 10. In the copolymer, the content of units derived from octene-1 was 96 mol % and the content of units derived from 7-methyl-1,6-octadiene was 4 mol %.

The polymerization conditions employed above are shown in Table 7.

TABLE 7

| | Ti concn. mmol/l | Al concn. mmol/l iBu₃Al | Third component | mmol/l | Hydrogen l/hr | Nitrogen l/hr | Higher α-olefin | | MOD ml | Temp. °C. | Copolymer yield, g | [η] dl/g | IV |
|---|---|---|---|---|---|---|---|---|---|---|---|---|---|
| Example 23 | 0.05 | 2.5 | TMES | 0.83 | 6 | 50 | Octene-1 | 100 | 5 | 50 | 14.3 | 4.5 | 10 |
| Example 26 | 0.05 | 2.5 | TMES | 0.83 | 3 | 50 | Hexene-1 | 90 | 5.5 | 50 | 13.9 | 5.1 | 12 |
| Example 27 | 0.05 | 2.5 | TMES | 0.83 | 8 | 50 | Decene-1 | 110 | 6.0 | 50 | 15.3 | 4.0 | 10 |

MOD: 7-Methyl-1,6-octadiene
TMES: Trimethylethoxysilane
iBu₃Al: Triisobutylaluminum
Polymerization conditions common to all) Polymerization time: 30 min., Solvent: Decane Preparation of vulcanized rubber There was prepared a blend in the usual way, said blend containing 50.0 parts by weight of the above-mentioned octene-1/7-methyl-1,6-octadiene copolymer rubber (1-d) as the higher α-olefin copolymer rubber (1), 50 parts by weight of an ethylene/propylene/5-ethylidene-2-norbornene copolymer rubber (3-a) having the ethylene/propylene molar ratio of 70/30, an intrinsic viscosity [η], as measured in decahydronaphthalene at 135° C., of 2.5 dl/g, and an iodine value of 5-ethylidene-2-norbornene of 15, 5.0 parts of zinc white No. 1 (a product of Sakai Kagaku Kogyo K.K.), 1.0 part by weight of stearic acid, 50.0 parts by weight of FEF carbon (Seast SO, a product of Tokai Carbon K.K.), 10.0 parts by weight of naphthenic oil (Sunthene 4240, a product of Nippon Sun Petroleum K.K.), 1.0 part by weight of sulfur, and 0.5 parts by weight of 2-mercaptobenzothiazole (Sanceler-M, a product of Sanshin Kagaku Kogyo K.K.) and 1.5 parts by weight of tetramethylthiuram disulfide (Sanceler-TT, a product of Sanshin Kagaku Kogyo K.K.) as the vulcanizing accelerators.

In preparing the above-mentioned blend, the above-mentioned copolymer (1-d), stearic acid, zinc white, FEF carbon and naphthenic oil were kneaded together for 6 minutes by means of a 4.3 liter Banbury mixer (manufactured by Kobe Steel K.K.), and allowed to stand under room temperature for one day.

The kneadate thus obtained was then mixed with the vulcanizing accelerators and sulfur by means of a 14-inch open roll, under such conditions of mixing time of 4 minutes on the open roll, the surface temperature of open mill front roll of 60° C., and that of open mill back roll of 70° C., the number of revolution of open mill front roll of 16 rpm, and that of open mill back roll of 18 rpm.

Subsequently, the thus obtained compound rubber was rolled into a sheet, and the sheet was pressed at 150° C. for 30 minutes to prepare a vulcanized sheet which was then put to the following tests.

Test item

Tensile test, hardness test, aging test, flex test and test of vibration-damping properties.

Results obtained are shown in Table 8.

EXAMPLE 24

Example 23 was repeated except that the amounts of the copolymer rubber (1-d) and copolymer rubber (3-a) used were changed to 20 parts by weight and 80 parts by weight, respectively, to obtain a vulcanized sheet which was then put to the above-mentioned tests.

Results obtained are shown in Table 8.

EXAMPLE 25

Example 23 was repeated except that the amounts of the copolymer rubber (1-d) and copolymer rubber (3-a) used were changed to 20 parts by weight and 80 parts by weight, respectively, to obtain a vulcanized sheet which was then put to the above-mentioned tests.

Results obtained are shown in Table 8.

COMPARATIVE EXAMPLE 9

Example 23 was repeated except that in place of the copolymer rubber (1-d) and copolymer rubber (3-a), there was used 100 parts by weight of the copolymer rubber (3-a) alone to obtain a vulcanized sheet which was then put to the above-mentioned tests.

Results obtained are shown in Table 8.

EXAMPLE 26

Example 23 was repeated except that in place of the copolymer rubber (1-d), there was used a hexene-1/7-methyl-1,6-octadiene copolymer rubber (1-e) prepared by copolymerization carried out similarly in Example 23 under the conditions as shown in the above-mentioned Table 7 to obtain a vulcanized sheet which was then put to the above-mentioned tests.

The hexene-1/7-methyl-1,6-octadiene copolymer rubber had an intrinsic viscosity [η] (135° C., decahydronaphthalene) of 5.1 dl/g and an iodine value (IV) of 12. In the copolymer, the content of units derived from hexene-1 was 96 mol % and the content of units derived from 7-methyl-1,6-octadiene was 4 mol %.

Results obtained are shown in Table 8.

EXAMPLE 27

Example 23 was repeated except that in place of the copolymer rubber (1-d), there was used a decene-1/7-methyl-1,6-octadiene copolymer rubber (1-f) obtained by copolymerization carried out similarly in Example 23 under the conditions as shown in the above-mentioned Table 7 to obtain a vulcanized sheet which was then put to the above-mentioned tests.

The above-mentioned decene-1/7-methyl-1,6-octadiene copolymer rubber had an intrinsic viscosity [η] (135° C., decahydronaphthalene) of 4.0 dl/g and an iodine value (IV) of 10. In the copolymer, the content of units derived from decene-1 was 95 mol % and the content of units derived from 7-methyl-1,6-octadiene was 5 mol %.

Results obtained are shown in Table 8.

EXAMPLE 28

Example 23 was repeated except that in place of the copolymer rubber (3-a), there was used an ethylene/1-butene/5-ethylidene-2-norbornene copolymer rubber (3-b) to obtain a vulcanized sheet which was then put to the above-mentioned tests.

The above-mentioned ethylene/1-butene/5-ethylidene-2-norbornene copolymer rubber had the ethylene/1-butene molar ration of 90/10, an intrinsic viscosity [η] (135° C., decahydronaphthalene) of 2.8 dl/g and an iodine value (IV) of 10.

Results obtained are shown in Table 8.

TABLE 8

| | Ex. 23 | Ex. 24 | Ex. 25 | Compar. Ex. 9 | Ex. 26 | Ex. 27 | Ex. 28 |
|---|---|---|---|---|---|---|---|
| Higher α-olefin copolymer rubber (1) | | | | | | | |
| α-olefin | Octene-1 | Octene-1 | Octene-1 | | Hexene-1 | Decene-1 | Octene-1 |
| Non-conjugated diene | MOD | MOD | MOD | | MOD | MOD | MOD |
| Ethylene α-olefin copolymer rubber (3) | | | | | | | |
| α-olefin | Propylene | Propylene | Propylene | Propylene | Propylene | Propylene | Butene-1 |
| Polyene | ENB | ENB | ENB | ENB | ENB | ENB | ENB |
| Tensile test | | | | | | | |
| Tensile strength $T_B$ [kg f/cm$^2$] | 151 | 137 | 165 | 179 | 160 | 145 | 215 |
| Elongation $E_B$ [%] | 540 | 540 | 560 | 590 | 500 | 550 | 650 |
| Hardness test | | | | | | | |
| Spring hardness [$H_s$ JIS A] | 54 | 51 | 55 | 61 | 55 | 53 | 69 |
| Aging test | | | | | | | |
| Retention of tensile strength $A_R$ ($T_B$) (%) | 90 | 87 | 88 | 82 | 88 | 85 | 93 |
| Retention of elongation $A_R$ ($E_B$) (%) | 76 | 78 | 75 | 75 | 77 | 80 | 82 |
| Flex test | | | | | | | |
| Number of times before growth of crack [time] | at least $10^5$ | at least $10^5$ | $6 \times 10^4$ | at least $10^3$ | at least $10^5$ | at least $10^5$ | at least $10^5$ |
| Vibration-damping properties | | | | | | | |
| Dissipation factor | 0.43 | 0.51 | 0.25 | 0.10 | 0.46 | 0.42 | 0.46 |

MOD: 7-Methyl-1,6-octadiene
ENB: 5-Ethylidene-2-norbornene

What is claimed is:

1. A vulcanizable rubber composition comprising a copolymer consisting essentially of 70 to 99.99 mol % of an α-olefin having 8–12 carbon atoms and 0.01 to 30 mol % of 7-methyl-1,6-octadiene non-conjugated diene,
   wherein the intrinsic viscosity ($\eta$) of said copolymer, as measured in decahydronaphthalene at 135° C. is from 1.0 to 10.0 dl/g and the iodine value of the α-olefin copolymer is from 1 to 50.

2. The copolymer of claim 1 wherein the α-olefin is a member selected from the group consisting of octene-1 and decene-1.

3. A vulcanizable rubber composition containing a copolymer rubber (1) of an α-olefin having 8–12 carbon atoms and a non-conjugated diene consisting essentially of 7-methyl-1,6-octadiene, and
   a diene rubber (2), wherein the intrinsic viscosity ($\eta$) of the α-olefin copolymer rubber (1), as measured in decahydronaphthalene at 135° C. is from 3.0 to 8.0 dl/g, the iodine value of the α-olefin copolymer rubber (1) is from 4 to 20, and the weight ratio of the α-olefin copolymer rubber (1)/diene rubber (2) is from 20/80 to 80/20.

4. The rubber composition of claim 3 wherein the diene rubber (2) is natural rubber, isoprene rubber, SBR, BR or a mixture thereof.

5. The rubber composition of claim 3 wherein the copolymer rubber (1) consists essentially of 70 to 99.99 mol % of α-olefin having 8–12 carbon atoms and 0.01 to 30 mol % of non-conjugated diene.

6. The vulcanization composition of claim 3 or 5 wherein the α-olefin is a member selected from the group consisting of octene-1 and decene-1.

7. A vulcanizable rubber composition containing a copolymer rubber (1) of an α-olefin having 8–12 carbon atoms and a non-conjugated diene consisting essentially of 7-methyl-1,7-octadiene, and
   an ethylene/α-olefin copolymer rubber (3), wherein the intrinsic viscosity ($\eta$) of the α-olefin copolymer rubber (1), as measured in decahydronaphthalene at 135° C. is from 3.0 to 8.0 dl/g, the iodine value of the α-olefin copolymer rubber (1) is from 4 to 20, and the weight ratio of the α-olefin copolymer rubber (1)/α-olefin copolymer rubber (3) is from 20/80 to 80/20.

8. The rubber composition of claim 7 wherein the α-olefin copolymer rubber (3) is ethylene/propylene or ethylene/1-butene copolymer rubber.

9. The rubber composition of claim 7 wherein the intrinsic viscosity ($\eta$) of the ethylene/α-olefin copolymer rubber (3), as measured in decahydronaphthalene at 135° C., is from 0.8 to 5.0 dl/g.

10. The rubber composition of claim 7 wherein the ethylene/α-olefin copolymer rubber (3) contains 0.1–5 mol % of non-conjugated polyene.

11. The rubber composition of claim 7 wherein the α-olefin copolymer rubber (3) is ethylene/propylene or ethylene/1-butene, and the intrinsic viscosity ($\eta$) of the ethylene/α-olefin copolymer rubber (3), as measured in decahydronaphthalene at 135° C., is from 0.8 to 5.0 dl/g.

12. The rubber composition of claim 7 wherein the α-olefin copolymer rubber (3) is ethylene/propylene or ethylene/1-butene, and the ethylene/α-olefin copolymer rubber (3) contains 0.1–5 mol % of non-conjugated polyene.

13. The rubber composition of claim 7 wherein the intrinsic viscosity ($\eta$) of the ethylene/α-olefin copolymer rubber (3), as measured in decahydronaphthalene at 135° C., is from 0.8 to 5.0 dl/g, and the ethylene/α-olefin copolymer rubber (3) contains 0.1–5 mol % of non-conjugated polyene.

14. The rubber composition of claim 7 wherein the copolymer rubber (1) consists essentially of 70 to 99.99 mol % of α-olefin having 8–12 carbon atoms and 0.01 to 30 mol % of non-conjugated diene.

15. The vulcanization rubber composition of claim 7, 11 or 14 wherein the α-olefin is a member selected from the group consisting of octene-1 and decene-1.

16. A process for preparing a copolymer of an α-olefin having 8–12 carbon atoms and a non-conjugated diene consisting essentially of 7-methyl-1,6-octadiene,
   said process comprising carrying out a copolymerization reaction by contacting said α-olefin and said non-conjugated diene with a polymerization catalyst obtained from
- (A) solid titanium catalyst component containing magnesium, titanium, halogen and an electron donor as essential components,
- (B) an organoaluminum compound catalyst component, and
- (C) an electron donor catalyst component represented by the formula R₃Si(OR') wherein R is lower alkyl group and R' is lower alkyl or phenyl group, and obtaining a copolymer in which
  - (a) the non-conjugated diene content is from 0.01 to 30 mol %, and (b) the intrinsic viscosity ($\eta$) of said copolymer, as measured in decahydronaphthalene at 135° C., is from 1.0 to 10.0 dl/g.

17. The process of claim 16 for preparing the α-olefin copolymer wherein the copolymer obtained consists essentially of 70 to 99.99 mol % of α-olefin having 8–12 carbon atoms and 0.01 to 30 mol % of non-conjugated diene.

18. The process of claim 16 or 17 wherein the electron donor catalyst component (C) consists essentially of trimethylethoxysilane and the α-olefin is a member selected from the group consisting of octene-1 and decene-1.

19. The process of claim 16 or 17 wherein the electron donor catalyst component (C) consists essentially of trimethylmethoxysilane and the α-olefin is a member selected from the group consisting of octene-1 and decene-1.

20. The process of claim 16 or 17 wherein the electron donor catalyst component (C) consists essentially of trimethylphenoxysilane and the α-olefin is a member selected from the group consisting of octene-1 and decene-1.

21. A process for preparing a copolymer of an α-olefin having 8–12 carbon atoms and a non-conjugated diene consisting essentially of 7-methyl-1,6-octadiene,
   said process comprising carrying out a copolymerization reaction by contacting said α-olefin and said non-conjugated diene with a polymerization catalyst obtained from
   - (A) a solid titanium catalyst component containing magnesium, titanium, halogen and an electron donor as essential components,
   - (B) an organoaluminum compound catalyst component, and
   - (C) an electron donor catalyst component represented by the formula $R_nSi(OR')_{4-n}$ wherein n is 3, R is $C_1$ to $C_5$ alkyl group and R' is $C_1$ to $C_4$ alkyl or phenyl group, and obtaining a copolymer in which
   - (a) the non-conjugated diene content is from 0.01 to 30 mol %, and (b) the intrinsic viscosity ($\eta$) of said copolymer, as measured in decahydronaphthalene at 135° C., is from 1.0 to 10.0 dl/g.

* * * * *